United States Patent
Jayaraj et al.

[11] Patent Number: 5,995,361
[45] Date of Patent: *Nov. 30, 1999

[54] LIQUID CRYSTALLINE POLYMER CAPACITORS

[75] Inventors: Kumaraswamy Jayaraj, Foxboro; James M. Burnett, Maynard; Joseph W. Piche, Raynham; Paul J. Glatkowski, Littleton; Richard W. Lusignea, Brighton, all of Mass.

[73] Assignee: Foster-Miller, Inc., Waltham, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/781,393

[22] Filed: Jan. 10, 1997

[51] Int. Cl.⁶ .................................................... H01G 4/32
[52] U.S. Cl. .............................. 361/511; 361/524; 428/1; 428/416; 264/289.3
[58] Field of Search .................................... 361/500, 501, 361/502, 503, 504, 512, 523, 524, 511; 264/108, 290.2, 289.3, 184, 289.6; 428/1, 220; 29/25.03

[56] References Cited

U.S. PATENT DOCUMENTS

| | | | |
|---|---|---|---|
| 3,694,055 | 9/1972 | Bergman, Jr. et al. | 350/157 |
| 3,878,274 | 4/1975 | Murayama et al. | 264/2 |
| 4,434,209 | 2/1984 | Sasaki et al. | 428/416 |
| 4,439,811 | 3/1984 | Sasaki et al. | 361/313 |
| 4,507,983 | 4/1985 | Kiss | 74/572 |
| 4,547,832 | 10/1985 | Lavene | 361/307 |
| 4,606,875 | 8/1986 | Chenevey et al. | 264/85 |
| 4,720,424 | 1/1988 | Eickman et al. | 428/323 |
| 4,783,150 | 11/1988 | Tabony | 350/351 |
| 4,845,150 | 7/1989 | Kovak et al. | 524/602 |
| 4,871,595 | 10/1989 | Lusignea et al. | 428/1 |
| 4,876,120 | 10/1989 | Belke et al. | 428/1 |
| 4,894,419 | 1/1990 | Mizuno et al. | 525/189 |
| 4,898,924 | 2/1990 | Chenevey et al. | 528/183 |
| 4,939,215 | 7/1990 | Mueller et al. | 525/434 |
| 4,939,235 | 7/1990 | Harvey et al. | 528/337 |
| 4,959,492 | 9/1990 | Harris et al. | 562/453 |
| 4,963,428 | 10/1990 | Harvey et al. | 428/220 |
| 4,966,806 | 10/1990 | Lusignea et al. | 428/220 |
| 4,966,807 | 10/1990 | Harvey et al. | 428/220 |
| 4,973,442 | 11/1990 | Harvey et al. | 264/503 |
| 4,975,312 | 12/1990 | Lusignea et al. | 428/209 |
| 5,006,605 | 4/1991 | Mizuno et al. | 525/189 |
| 5,054,888 | 10/1991 | Jacobs et al. | 359/76 |
| 5,135,783 | 8/1992 | Harvey et al. | 428/1 |
| 5,168,011 | 12/1992 | Kovar et al. | 428/373 |
| 5,202,165 | 4/1993 | Lusignea et al. | 428/1 |
| 5,268,584 | 12/1993 | Dowell | 252/299.01 |
| 5,302,334 | 4/1994 | Pierini et al. | 264/233 |
| 5,328,654 | 7/1994 | Dixit | 264/289 |
| 5,501,831 | 3/1996 | Kovar, et al. | 264/503 |
| 5,529,741 | 6/1996 | Rubin et al. | 264/435 |
| 5,688,613 | 11/1997 | Li et al. | 429/192 |
| 5,688,614 | 11/1997 | Li et al. | 429/192 |

FOREIGN PATENT DOCUMENTS

3-241606  10/1991  Japan .

OTHER PUBLICATIONS

Abstract of U.S. Patent 4,813,116, Thiel et al., Mar. 21, 1989 (From Derwent Information Ltd.).
Abstract of EP 72458, Thiel et al., Feb. 23, 1983 (From Derwent Information Ltd.).
Abstract of U.S. Patent 4,623,953, Dakin, Nov. 18, 1986 (From IFI/Plenum Data Corp.).
Abstract of U.S. Patent 4,618,507, Sadhir, Oct. 21, 1986 (From IFI/Plenum Data Corp.).

*Primary Examiner*—Kristine Kincaid
*Assistant Examiner*—Anthony Dinkins
*Attorney, Agent, or Firm*—David G. Conlin; Linda M. Buckley; Cara Z. Lowen

[57] ABSTRACT

This invention relates in general to capacitors including one or more layers of dielectric material wherein at least one of the layers including a multiaxially oriented lyotropic liquid crystalline polymer (LCP) film. The present invention also provides lyotropic LCPs films having less than 0.5% residual ionic contaminants and a method of preparing such films and capacitors including such films. In preferred embodiments, the invention further provides a capacitor wherein the liquid crystalline polymer film has less than 0.5% residual ionic contaminants.

21 Claims, 15 Drawing Sheets

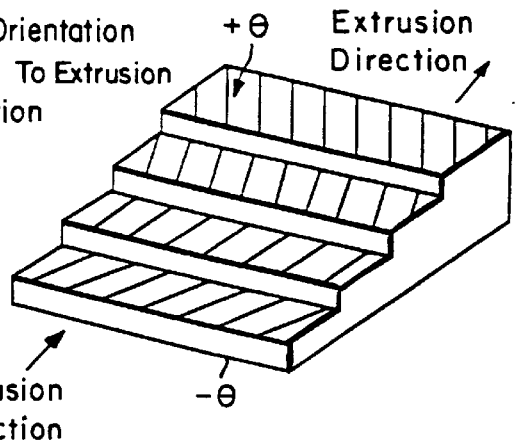
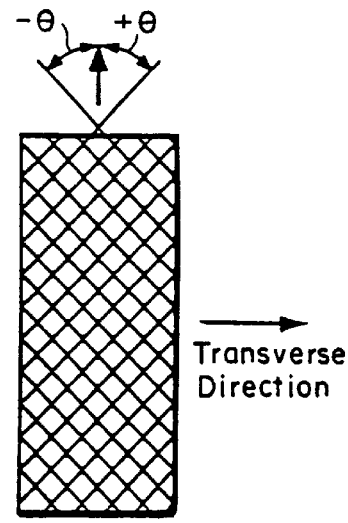
FIG. 12A
FIG. 12B
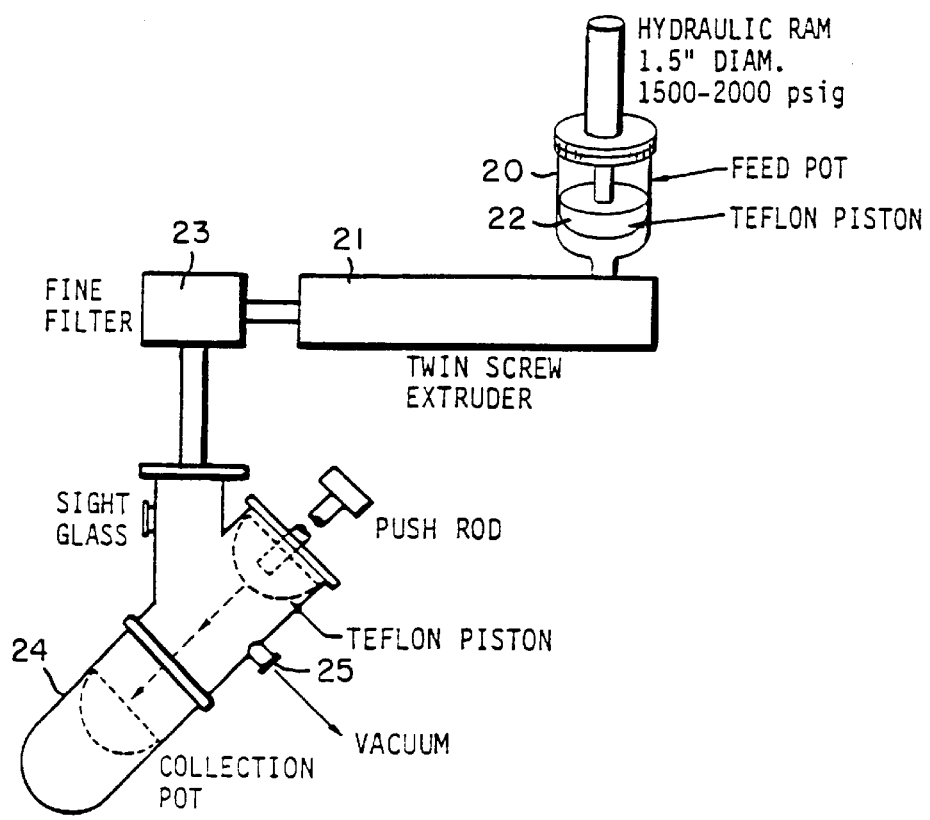
FIG. 13

LIQUID CRYSTALLINE POLYMER CAPACITORS

STATEMENT OF GOVERNMENT SUPPORT

Funding for this invention was provided in part by the Government of the United States of America, through Contract No. F33615-89-C-2976, by the Aeropropulsion and Power Directorate, Wright Laboratory, Air Force Material Command, Wright Patterson AFB. The Government has certain rights in this invention.

FIELD OF THE INVENTION

This invention relates to capacitors having improved electrical and physical properties, and to methods of making such capacitors. In particular, capacitors having high energy storage capacity, high repetition rate and/or ability to operate at high temperatures for extended periods of time are provided by the present invention.

BACKGROUND OF THE INVENTION

Improvements in capacitor design have been hampered in recent years because of the limitations in both physical and electrical properties of currently available dielectric films. These limitations reduce the thermal range, energy storage capabilities and reliability of capacitors incorporating such dielectrics, imposing particularly acute restrictions on the design and construction of high temperature, high energy density, and high repetition rate capacitors.

Polymeric materials that are used in current designs or have been tested in prototype designs include: polypropylene, PPS, PVDF, polycarbonate, polysulfone, polystyrene, Kapton, Upilex, and several other proprietary advanced polyimides. None of these materials are capable of functioning in the range of 300° C. for extended periods of time without dramatic reductions in electrical integrity. Nor are they capable of meeting the energy density goals of high energy storage capacitors.

For high energy capacitor applications, the storage capacity of a given capacitor is determined primarily by the dielectric constant and the dielectric breakdown strength of the dielectric. The energy that can be stored in a capacitor comprising a dielectric medium placed between two electrodes can be represented by the equation:

$$E = \tfrac{1}{2} CV^2$$

where C is the capacitance of the capacitor and V is the charging voltage. For a simple parallel plate capacitor, C is given by:

$$C = K_o A/t$$

where $K_o$ is the permittivity in free space, K is the relative permittivity, A is the area, and t is the thickness of the dielectric medium, respectively. The term dielectric constant is used instead of relative permittivity in the industry and will also be used here.

Polymers in general have relatively low dielectric constants (2 to 15), but high capacitance values can be obtained by winding thin polymer films. The energy density of a capacitor, in which most of the weight is in the polymer component, can be represented by the equation:

$$Ed = E/M = (K_o) F^2 / 2\rho$$

where F is the electric field (volts/unit thickness) and $\rho$ is the density of the dielectric. For practical capacitors, the energy density will be lower due to the weight of electrodes, end tabs, and the casing. But for very large capacitors, especially when metallized films are used as electrodes, this equation is a very good estimate of the energy density.

The storage capacity of a capacitor is limited by the highest electric field that can be imposed on it. This in turn is limited by the ultimate breakdown strength of the dielectric. To maximize the energy density of a capacitor, it is desirable to use lightweight materials with a high dielectric constant, e.g., 3–15, and a very high breakdown strength, e.g., 7–16 kv/mil. Because the storage capacity has a squared dependence on the electric field, the breakdown strength of the dielectric is of primary importance in high energy storage of the dielectric in this application. Polymers are generally of low density (approximately 1 to 2 grams/$cm^3$), and tend to have high breakdown strengths, which offset their low dielectric constant values in capacitor applications.

For most materials, the dielectric breakdown values are in the 10 Kv/mil range, which can translate to potential energy densities on the order of 1 kilojoule/kilogram.

Some of the energy stored in a capacitor will be dissipated as heat due to losses in the electrode and the dielectric medium. The dissipation factor is a measure of the amount of stored energy converted to heat in the dielectric medium. In high burst mode operation, the capacitor operates essentially under adiabatic conditions, with negligible heat loss or dissipation to the surroundings. All the energy lost in the capacitor goes towards heating the capacitor. The temperature rise due to dielectric heating, under adiabatic conditions is given by:

$$VT \; \alpha \; E \times DF \times P/M \; Cp$$

where E is the energy stored per pulse, DF is the dissipation factor, P is the repetition rate and M and Cp are the mass and specific heat of the capacitor, respectively. Since E/M is the energy density of the capacitor, this equation may be written as:

$$VT \; \alpha \; Ed \times DF \times P/M \; Cp$$

Clearly to achieve a high energy density and high repetition rate with a low temperature increase, it is desirable to use a dielectric material which has a low dissipation factor, high breakdown strength, high thermal stability, and a low coefficient of thermal expansion. It is desirable to have such a dielectric which enables a capacitor to exhibit stable electrical properties over a wide range of temperatures and frequencies. Currently available capacitors are deficient both in terms of energy storage and repetition rate, as well as operating temperature range due to deficiencies in the available dielectric materials.

SUMMARY OF THE INVENTION

It has been discovered that capacitors having high energy storage capacity, high repetition rate, and/or the ability to operate at high temperatures for extended periods of time can be achieved by use of films comprising multiaxially oriented lyotropic liquid crystalline polymers (LCPs). A multiaxial orientation provides strength to the film in both the machine and transverse direction. The capacitors of this invention typically comprise one or more layers of dielectric material wherein at least one of the layers comprises a multiaxially, e.g., biaxially, oriented lyotropic liquid crystalline polymer film. It has also been discovered that residual ionic contamination which may be present in such films due to processing conditions, undesirable in some applications, can be greatly reduced.

The following definitions of multiaxially oriented film strength characteristics will be important in understanding the present invention. "Balanced biaxial" means a film having maximum strength and stiffness at approximately ±45° of the machine direction, but exhibiting the least angular dependence of these properties. "Predominantly uniaxial" means a film having maximum strength and stiffness in the machine direction, but also with some strength within ±20° of the machine direction. "Nearly uniaxial" means a film having maximum strength and stiffness in the machine direction, with some strength within only ±5° of the machine direction. As used herein, the generic term for those orientations not meeting the specific definitions above, but providing strength to a film in both the machine and transverse directions is "multiaxial."

The present invention provides in one aspect a capacitor comprising at least one layer of dielectric material wherein at least one of the layers comprises a multiaxially, e.g., biaxially, oriented lyotropic liquid crystalline polymer film. Multiaxial orientation of the lyotropic LCP molecules greatly improves the mechanical and electrical properties of the capacitor dielectric. The multiaxial orientation provides excellent dielectric strength (e.g., 10–25 Kv/mil), low dissipation factors (e.g., 0.0002 at 1 Khz, 25° C.), low moisture absorption (<0.01%), excellent thermal stability, very low coefficient of thermal expansion resulting in excellent dimensional stability and stable electrical properties over a wide temperature and frequency range.

In one preferred embodiment, the present invention provides capacitors wherein the orientation of the lyotropic liquid crystalline polymer film is biaxial. More preferably the lyotropic liquid crystalline film is biaxially oriented within a range from about ±5° to about ±45° of machine direction. Most preferably, the film has a biaxial orientation of from about ±40° to about ±45° of machine direction.

The dissipation factor of the multiaxially oriented lyotropic liquid crystalline polymer is preferably below about 0.002 at 1 Khz. The breakdown strength of the multiaxially oriented lyotropic liquid crystalline polymer is preferably greater than about 10 Kv/mil. The energy density of the capacitors is preferably about 1 to 3 J/gm. The dielectric loss factor is preferably from about 0.01 to 0.015 over the temperature range of 200 to 300° C. The invention further provides a capacitor having an operating temperature of about 300 to 350° C.

Polybenzazole (PBZ) polymers are preferred lyotropic liquid crystal polymers (LCPs) for use in the present invention. Preferred PBZ polymers are selected from the group consisting of polybenzoxazole (PBO), polybenzothiazole (PBT or PBZT) and polybenzimidazole (PBI) polymers, and random, sequential or block copolymers thereof. PBO is a particularly preferred LCP for use in the capacitors of the present invention.

Films comprising biaxially or multiaxially oriented LCPs and processes of producing such films are described, e.g., in the following U.S. Pat. Nos.: 4,871,595; 4,939,235; 4,963,428; 4,966,807; and 5,288,529 (hereinafter referred to as "Extrusion Processes"). Lyotropic LCPs are processed in accordance with these Extrusion Processes which enable the production of film-based articles of manufacture that have highly controlled multiaxial, e.g., biaxial, orientation, resulting in films and tubes that have property balances that are much more useful from a practical standpoint than ordinary uniaxially oriented components. The disclosure of each of the patents referred to is incorporated herein by reference. Flat films having a balanced biaxial orientation are particularly suitable for capacitor applications. The use of these LCP films as dielectrics in the design of high performance capacitors represents a new and unique application of these materials.

In certain embodiments of capacitors of the present invention, the capacitor is fabricated by a winding process. In others, the capacitor is fabricated by a lay-up procedure.

The present invention also provides lyotropic LCPs having less than 0.5% residual ionic contaminants and a method of preparing such films and capacitors including such films.

Lyotropic liquid crystalline polymers may be processed by use of reagents which leave a residue of ionic contaminants. For example, PBZ is preferably processed in a concentrated acid solution. Although the film is washed and dried, the dried film contains up to 1.5% residual ionic contaminants, more specifically residual phosphorous of up to 0.5% or approximately up to 1.5% residual phosphoric acid. Residual ionic species in dielectric films contribute to the increase in dielectric loss. Therefore, it is desirable to minimize ionic contaminants in the film for use as a dielectric material in the capacitors of this invention, in order to decrease the dielectric loss (or loss tangent). Low dielectric loss is particularly desirable for the high temperature and high energy density capacitors of this invention.

In preferred embodiments, the invention further provides a capacitor wherein the liquid crystalline polymer film has less than 0.5% residual ionic contaminants.

The present invention also provides a method of removing residual ionic contaminants from liquid crystalline polymer film comprising washing the film in a surfactant solution. The surfactant solution preferably comprises a non-ionic surfactant. Preferably the non-ionic surfactant is an alkylaryl polyether alcohol. It is preferred that the alkylaryl polyether alcohol is actylphenol, and more preferably that the surfactant is selected from at least one of TRITON X-45 or TRITON X-100. In another embodiment this method further comprises washing the film in high temperature deionized water. In preferred methods, the temperature of the deionized water is from about 80 to 95° C.

In yet another embodiment, the method further comprises washing the film in high temperature deionized water at high pressure. Preferably, the deionized water is at a temperature of from about 80° C. to 120° C. and at a pressure of about 0 atm to 2 atm.

In still another embodiment the method further comprises the step of washing the film in at least one organic solvent. In certain preferred embodiments the organic solvent is aliphatic alcohol having 1 to 2 carbons. Most preferably the alcohol is ethanol or methanol.

The present invention also provides a lyotropic liquid crystalline polymer film having less than 0.5% residual ionic contaminants. In certain embodiments the residual ionic contaminants comprise residual phosphorous. The residual ionic contaminants in the resulting films is preferably less than 0.01% of phosphorous or approximately 0.03% of phosphoric acid, and more preferably less than 0.006% of phosphorous or approximately 0.018% of phosphoric acid. The resulting drop in residual phosphorous corresponds to approximately a 100 fold reduction in the acid contamination. Decreasing the phosphoric acid content of the films to these levels improves the electronic quality of the films by lowering the dissipation factor. The removal of ionic contaminants from the LCP films therefore increases the usefulness of this film in high energy density capacitors and is also important for its use in high temperature capacitors. The reduced residual phosphoric acid content is not limited to the application of high performance electronics. It is desirable in virtually all areas of film and fiber applications to reduce the acid content in these materials.

In preferred lyotropic liquid crystalline polymer films of the present invention the dissipation factor of the film is below about 0.002 at 1 Khz. In certain lyotropic liquid crystalline polymer films, the film is biaxially oriented.

Accordingly, the present invention provides high energy density capacitors having improved energy storage capability, improved high temperature capability and lower energy losses. The improved capacitors of the present invention are useful in many applications, such as, but not limited to, AC filter, DC filters, singleshot and separated energy storage, and surface mount applications.

BRIEF DESCRIPTION OF THE FIGURES

FIG. 12 shows (a) the molecular orientation of a biaxially oriented LCP film in plane and (b) the molecular orientation through the film thickness.

FIG. 13 is a schematic diagram of the apparatus for homogenizing, degassing, and filtering LCP.

DETAILED DESCRIPTION OF THE INVENTION

The capacitors of the present invention include one or more layers of multiaxially oriented lyotropic LCP film. Multiaxial orientation may be imparted to LCP films during and after extrusion, e.g., by stretching, but to date no such post processing orientation technique provides the controlled orientation provided by the novel extrusion processes described below. However, any process for orienting LCPs which provides a similar degree of control and similar properties can be used in the practice of the present invention.

The significant electrical properties in the evaluation of a dielectric for application to capacitor design include, but are not limited to the following: dielectric strength, dielectric constant, electrical loss factor (or loss tangent or dissipation factor). Multiaxially, e.g, biaxially, oriented lyotropic LCPs unexpectedly function as excellent dielectric materials because they maintain these electrical properties over a wide range of temperatures. Capacitors of the present invention made with multiaxially oriented LCPs function in the temperature range of 200° C. to 350° C. That is an increase in temperature range of 100° C. over currently available dielectric films which previously limited the design of high temperature capacitors to approximately 200° C. Capacitors designed using these LCPs as dielectrics function over a much wider range of temperatures than previously fabricated capacitors.

One of the most outstanding characteristics of the capacitors of the present invention is low value of loss factor at high temperatures. Some capacitors known in the art exhibit low loss factors at ambient temperature, but not the range of 200° C. to 300° C. in contrast to the capacitors of the present invention which comprise lyotropic LCP polymers which exhibit extraordinarily low values for dielectric loss factor. Many other polymers exhibit low loss factors at ambient temperature, but not at higher temperatures. In marked contrast, lyotropic LCP polymers exhibit extraordinarily low values for dielectric loss factor in the range of 200 to 300° C., thus enabling the production of capacitors that function in this temperature range. Polyimides have been shown to have thermal stability that approaches that of lyotropic LCPs. However, the multiaxially oriented LCPs of the present invention unexpectedly were found to exhibit dramatic improvements in maintenance of electrical properties over a wider range of temperatures than polyimides. These surprising properties enable the production of the capacitors of the present invention.

Figure 19:
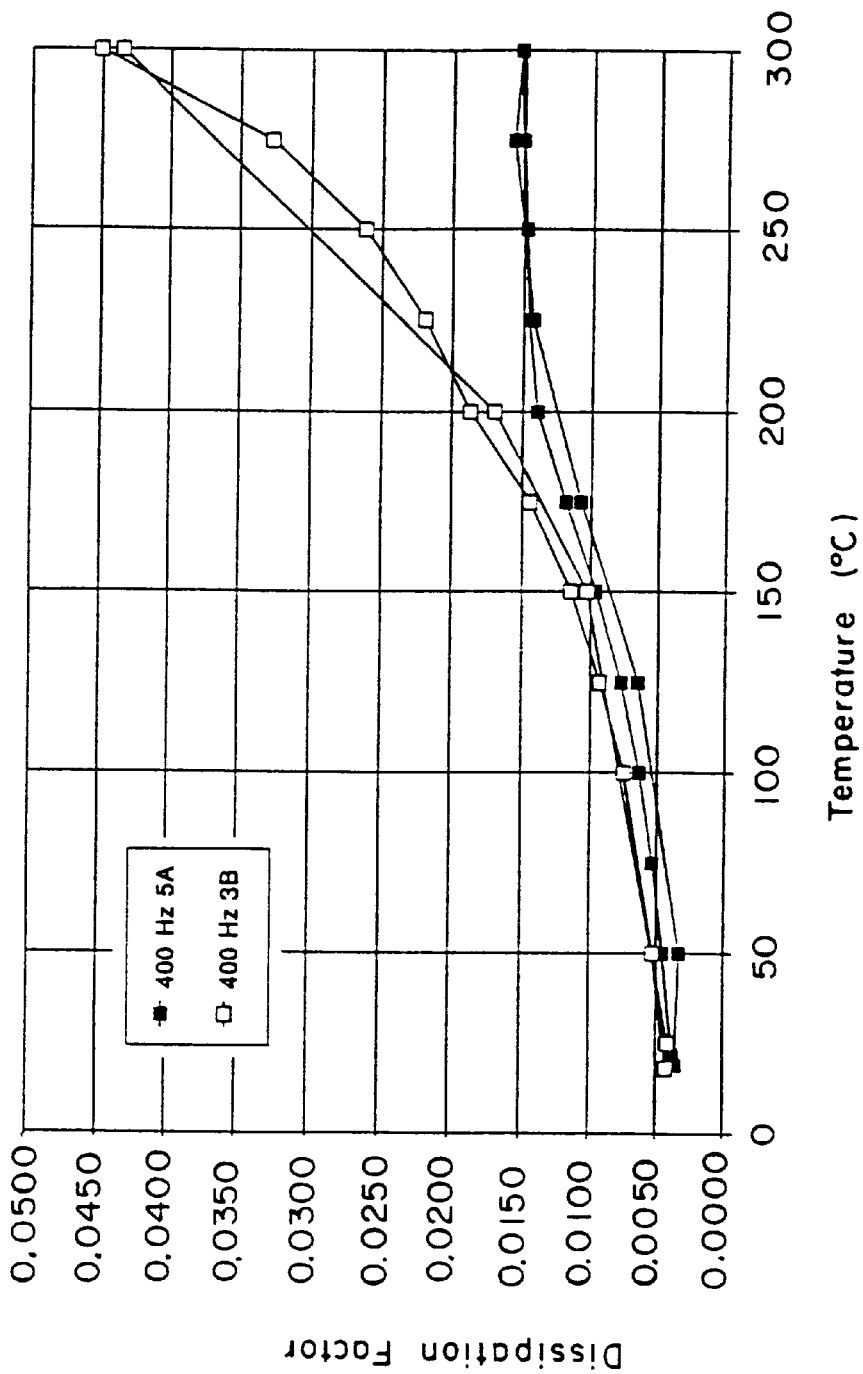
FIG. 19 is a graph of dissipation factor versus temperature of a film comprising PBO washed in accordance with present invention.

The dielectric loss factor of biaxial PBO films as a function of temperature is shown in FIG. 19. Maintenance of low electrical loss factor is of particular importance in the design and development of high energy density capacitors and high temperature capacitors because high values of loss factor indicate an inability of the dielectric to store charge for sufficient periods of time and can lead to internal heating at high temperatures. This internal heating increases the temperature of the capacitor to values exceeding the ambient temperature. An increase in the operating temperature of the capacitor will lead to an increase in the electrical loss factor of the dielectric. However, capacitors of the present invention are able to function at high temperatures due to the low loss factor of the LCP dielectric.

The present invention provides a capacitor comprising at least one layer of dielectric material wherein at least one of the layers comprises a multiaxially oriented lyotropic liquid crystalline polymer film. In preferred embodiments, the lyotropic liquid crystalline polymer film has a biaxial orientation in the range of from about ±5° to ±45° of machine direction. More preferably, the liquid crystalline polymer film has a biaxial orientation of from about ±40° to about ±45° of machine direction. The dissipation factor of the multiaxially oriented lyotropic liquid crystalline polymer is preferably below about 0.002 at 1 Khz; breakdown strength is preferably greater than about 10 Kv/mil; the energy density is preferably about 1 to 3 J/gm; and the dielectric loss factor is preferably from about 0.01 to 0.015 over the temperature range of 200 to 300° C.

The present invention further provides a capacitor having an operating temperature of about 300 to 350° C.

Capacitors according to this invention can be designed and fabricated in many ways, according to methods known in the art and including, but not limited to, flat lay-up or roll-film winding techniques. Flat and lay-up capacitors permit efficient heat removal, a major concern for high temperature filter capacitors.

Although the capacitors and methods of the present invention will be illustrated by the use of PBZ polymers, specifically PBO, it is not intended that they be so limited, lyotropic polymers being generally useful in the practice of the present invention.

The capacitors of this invention will be illustrated primarily through high energy density capacitors and high temperature capacitors which comprise PBZ LCP films. However, the practice of this invention also applies to capacitors for other applications, e.g., surface mount capacitors, AC filter and DC filter capacitors.

Polybenzazole (PBZ) polymers are preferred lyotropic liquid crystal polymers (LCPs) for use in the present invention. Preferred PBZ polymers are selected from the group consisting of polybenzoxazole (PBO), polybenzothiazole (PBT or PBZT) and polybenzimidazole (PBI) polymers, and random, sequential or block copolymers thereof. Polybenzazole polymers and their synthesis are described at length in numerous references, such as Wolfe, *Liquid Crystalline Polymer Compositions, Process and Products,* U.S. Pat. No. 4,533,693 (Aug. 6, 1985) and W. W. Adams et al., *The Material Science and Engineering of Rigid-Rod Polymers,* (Materials Research Society 1989), which are incorporated herein by reference.

PBZ polymers preferably contain a plurality of mer units that are AB-PBZ mer units, as represented in Formula 1(a), and/or AA/BB-PBZ mer units, as represented in Formula 1(b).

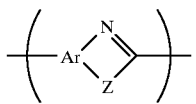

1(a) AB-PBZ

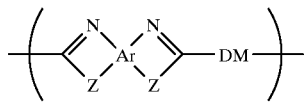

1(b) AA/BB-PBZ wherein:

Each Ar represents an aromatic group. The aromatic group may be heterocyclic, such as a pyridinylene group, but it is preferably carbocyclic. The aromatic group may be a fused or unfused polycyclic system. The aromatic group preferably contains no more than about three six-membered rings, more preferably contains no more than about two six-membered rings and most preferably consists essentially of a single six-membered ring. Examples of suitable aromatic groups include phenylene moieties, biphenylene moieties and bisphenylene ether moieties. Each Ar is most preferably a 1,2,4,5-phenylene moiety.

Each Z is independently an oxygen atom, a sulfur atom or a nitrogen atom bonded to an alkyl group or a hydrogen atom. Each Z is preferably oxygen or sulfur (the polymer is preferably PBO, PBT or a copolymer thereof);

Each DM is independently a bond or a divalent organic moiety that does not interfere with the synthesis, fabrication or use of the polymer. The divalent organic moiety may contain an aliphatic group (preferably $C_1$ to $C_{12}$), but the divalent organic moiety is preferably an aromatic group (Ar) as previously described. Each DM is preferably a 1,4-phenylene moiety or a 4,4'-biphenylene moiety, and is most preferably a 1,4-phenylene moiety.

The nitrogen atom and the Z moiety in each azole ring are bonded to adjacent carbon atoms in the aromatic group, such that a five-membered azole ring fused with the aromatic group is formed.

The azole rings in AA/BB-PBZ mer units may be in cis- or trans-position with respect to each other, as illustrated in 11 *Ency. Poly. Sci. & Eng.,* 601, at 602, (J. Wiley & Sons 1988) which is incorporated herein by reference.

The PBZ polymer may be rigid rod, semirigid rod or flexible coil. It is preferably rigid rod in the case of an AA/BB-PBZ polymer or semirigid in the case of an AB-PBZ polymer. It more preferably consists essentially of AA/BB-PBZ mer units. Exemplary highly preferred mer units are illustrated in Formulas 2(a)–(e).

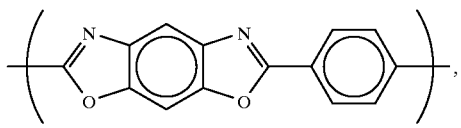

2(a)

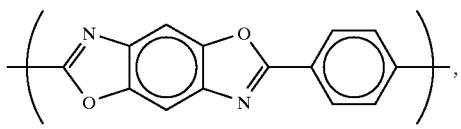

2(b)

-continued

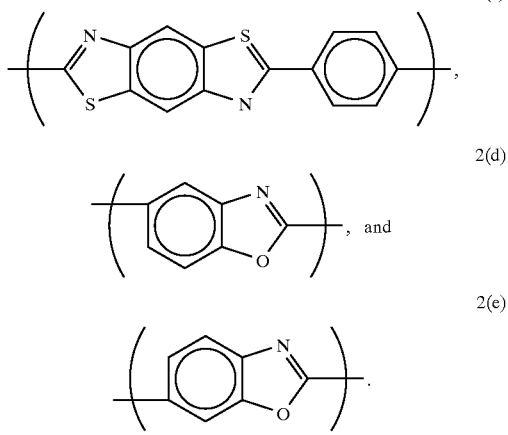

The polybenzazole polymer most preferably consists essentially either of the mer units illustrated Formula 2(a) (cis-PBO) or of the mer units illustrated in Formula 2(c) (trans-PBZT).

Each polymer preferably contains on average at least about 25 mer units, more preferably at least about 50 mer units and most preferably at least about 100 mer units. The intrinsic viscosity of cis-PBO or trans-PBZT in methanesulfonic acid at 25° C. is preferably at least about 10 dL/g, more preferably at least about 20 Dl/g and most preferably at least about 30 Dl/g. wherein each X is independently selected from the group consisting of sulfur and oxygen; and each Y is nitrogen.

An especially preferred PBX compound is PBO, which has the following structure.

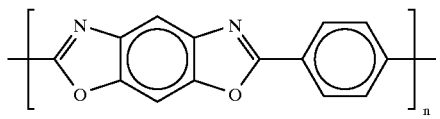

When ordered polymers such as PBT, PBI, and PBO are subjected to a shear force they become highly aligned in the direction of the applied force. By imparting to such polymers more than one such force, in-plane properties that are more balanced than those obtained with a single directional force are attained.

Figure 10:
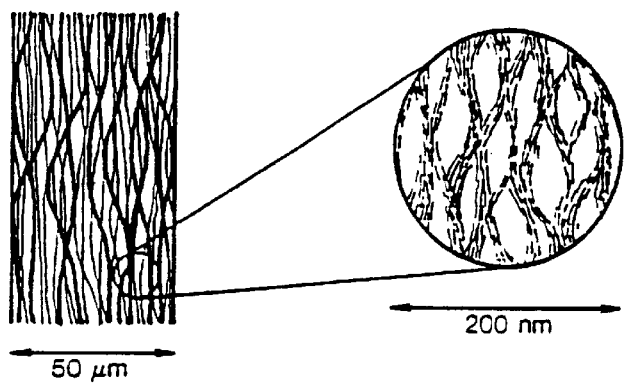
FIG. 10 shows a cross section of a wet coagulated biaxially oriented PBZT film 50 $\mu$m thick.
Figure 11:
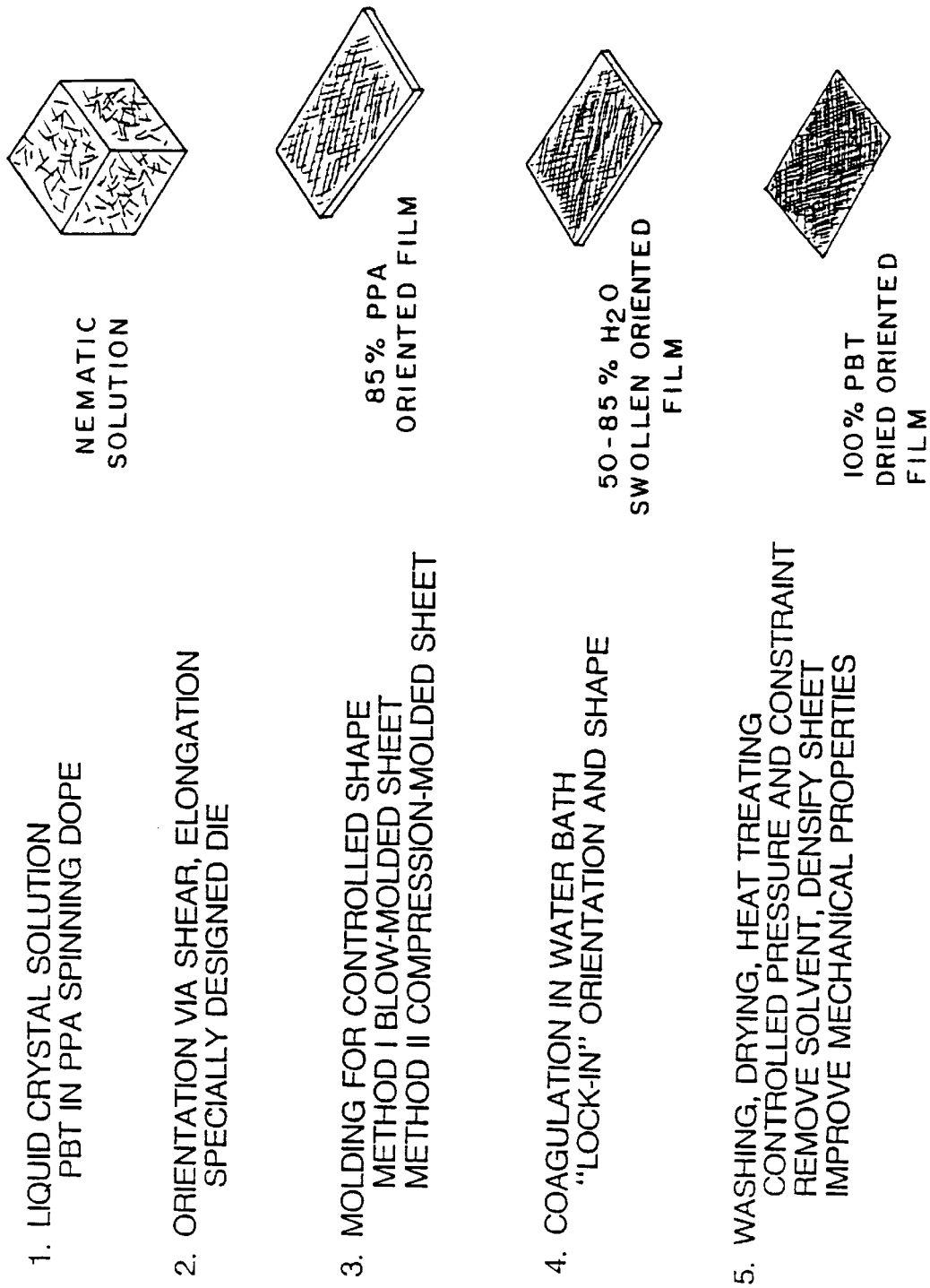
FIG. 11 shows the steps in preparing multiaxially oriented lyotropic LCP film.

Multiaxial orientation of the lyotropic LCP molecules greatly improves the mechanical and electrical properties of the capacitor dielectric. Multiaxially oriented films for use in the present invention can be prepared by a two stage orientation process, one of which occurs in a counter rotating-die, followed by post treatment to optimize the film property balance as disclosed in the Extrusion Processes below. The complete process involves dope homogenization and the use of an extruder to feed a gear pump, which in turn feeds the counter-rotating die. The film is blown and immediately quenched in a water bath. This bath serves to coagulate the film structure, hydrolyze the polyphosphoric acid and exchange the resulting phosphoric acid for water. At this state, the film is multiaxially oriented, highly water-swollen, porous, and extremely strong as shown in FIG. 10. Drying of this film, followed by heat-treatment in stages, produces a multiaxially oriented, high-modulus, high-tensile strength film for structural applications. FIG. 11 shows the microfibrils of PBZ film oriented at various angles to the machine direction as a function of the shear imposed on the polymer dope by the counter-rotating die. When multiaxially oriented, the rod-like molecules give rise to a self-reinforced film, which has the properties of a fiber reinforced composite but without the problems of distinct fiber and matrix components. Thus, PBZ and other ordered polymers can be made very thin (less than ~0.2 mil) with strength and stiffness over 80,000 psi and $10^7$ psi, respectively.

The thickness of the PBO film can range from about 0.1 $\mu$m to about 10 $\mu$m, and is preferably from about 1 $\mu$m to about 10 $\mu$m, and most preferably about 5 $\mu$m.

PBZ polymers have a much higher voltage breakdown strength and lower dissipation factor at 300° C. than state-of-art dielectric films. Samples of biaxially oriented PBZT films have exhibited breakdown strengths in the range of 10 to 25 kilovolts per mil. These materials, therefore, achieve energy densities that significantly exceed the energy densities of other dielectric films. These LCPs have very low dissipation factors, down to 0.0002 at 1 kHz, at 25° C. See Table 1. They also absorb very little moisture. LCPs exhibit excellent thermal stability, withstanding short-term exposures to 750° C. in nitrogen, and about 600° C. in air. Table 1 compares properties of common capacitor materials and shows that other polymers have also demonstrated thermal stability that approaches that of lyotropic LCPs. However the biaxially oriented LCPs exhibit dramatic improvements in maintenance of electrical properties over a wider range of temperatures. For example, polyimides are useful up to 300° C. but decompose over time. Other materials, such as polypropylene, have high breakdown strength and a low dissipation factor but have a maximum temperature of only about 176° C.

Table 1 is a summary of relevant electrical properties for common capacitor materials.

TABLE 1

| Material | Volume Resistivity ($\Omega$-cm) | Dielectric Constant (25° C., 1kH) | Dissipation Factor (25° C., 1kHz) | Breakdown Strength (kV/mil) | Max. Temp. (° C.) |
| --- | --- | --- | --- | --- | --- |
| PBZT (biaxially-oriented) | | 2.8 | 0.0002 | 10 to 25 | 300 |
| PVDF | $10^{15}$ | 10.7 | 0.0150 | 4.1 | 180 |
| PBT (unoriented) | — | 3.0 | 0.02 | 10 | 300 |
| Polyimide | $10^{16}$ | 3.5 | 0.0025 | 7.5 | — |
| Polyester | $10^{17}$ | 3.0 | 0.0050 | 7.5 | 250 |
| Polysulfone | $5 \times 10^{16}$ | 3.07 | 0.0008 | 7.5 | 315 |
| Polyetherimide | $6 \times 10^{15}$ | 3.0 | 0.0013 | — | — |
| Polycarbonate | $1 \times 10^{17}$ | 2.8 | 0.0008 | 6.8 | 270 |
| Polypropylene | $8 \times 10^{18}$ | 2.2 | 0.0002 | 8.0 | 176 |
| PTFE (Teflon) | $>10^{15}$ | 2.1 | 0.0001 | 5.0 | 327 |
| FEP | $>10^{16}$ | 2.0 | 0.0001 | 6.5 | 275 |
| HCC SIXEF-44 | — | 2.9 | 0.0012 | 4.1 | 250 |
| 3M FPE | $2 \times 10^{17}$ | 3.4 | 0.0028 | 6.4 | 250 |

Figure 20:
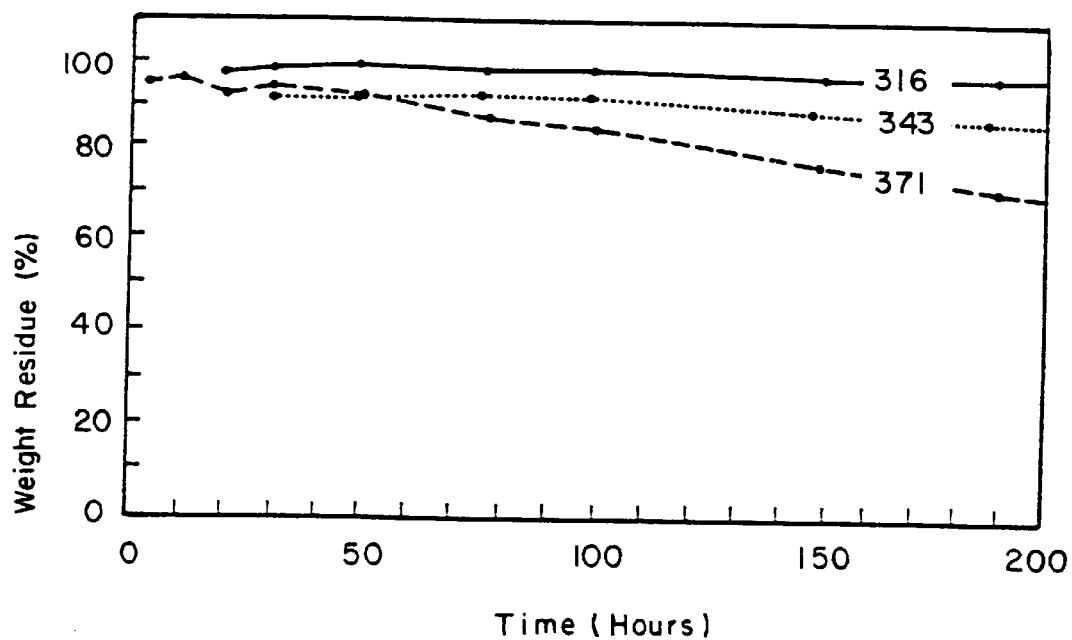
FIG. 20 is a graph of isothermal aging data of PBZT.

Isothermal aging studies performed on LCP films materials at temperatures ranging from 300° C. to 350° C. show minimal weight loss over several hundred hours at temperatures as high as 350° C., see FIG. 20. These studies show that the continuous use temperature of PBZT is about 300° C. which is about 100° C. higher than any other high temperature polymer. In addition to thermal stability at very high temperatures, these films exhibit flexibility and maintain their mechanical properties at temperatures as low as 20 degrees Kelvin. These polymers have a very low coefficient of thermal expansion which results in excellent dimensional stability.

These films maintain excellent electrical properties along with excellent thermal stability over a wide range of temperatures. Table 2 shows the dissipation factor (DF) for PBZT as a function of frequency and temperature, as well as data for four other high temperature dielectric materials. The data show that the dissipation factor for PBZT remains low even in temperatures ranging from 25° C. to 300° C. These electrical qualities, in conjunction with the high thermal stability of the LCP films, make these films excellent dielectric materials and, therefore, enable the production of the high energy density and high temperature capacitors of the present invention.

TABLE 2

Dissipation Factors of the Candidate High Temperature Capacitor Films

| Manufacturer | Temperature Film | °C. | 100 Hz | 100 Tanδ 400 Hz | 1 kHz | 10 kHz |
|---|---|---|---|---|---|---|
| Foster-Miller | PBZT | 25 | 0.06 | 0.02 | 0.02 | 0.03 |
| 3M | FPE | 25 | 0.20 | 0.21 | 0.26 | 0.53 |
| HCC | SIXEF | 25 | 0.22 | 0.15 | 0.13 | 0.11 |
| Maxdem | Polyquinoline | 25 | 0.09 | 0.04 | 0.03 | 0.02 |
| Dow Chemical | PBO Mol. Comp. | 50 | 0.95 | 0.76 | 0.67 | 0.51 |
| Foster-Miller | PBZT | 100 | 0.09 | 0.04 | 0.03 | 0.03 |
| 3M | FPE | 100 | 0.10 | 0.07 | 0.09 | 0.12 |
| HCC | SIXEF | 100 | 0.46 | 0.38 | 0.34 | 0.26 |
| Maxdem | Polyquinoline | 100 | 0.16 | 0.09 | 0.07 | 0.05 |
| Dow Chemical | PBO Mol. Comp. | 100 | 0.96 | 0.83 | 0.59 | 0.06 |
| Foster-Miller | PBZT | 150 | 0.14 | 0.09 | 0.09 | 0.06 |
| 3M | FPE | 150 | 0.08 | 0.07 | 0.07 | 0.08 |
| HCC | SIXEF | 150 | 0.57 | 0.53 | 0.52 | 0.43 |
| Maxdem | Polyquinoline | 150 | 0.41 | 0.23 | 0.17 | 0.09 |
| Dow Chemical | PBO Mol. Comp. | 150 | 0.87 | 0.74 | 0.75 | 0.67 |
| Foster-Miller | PBZT | 200 | 0.22 | 0.16 | 0.16 | 0.06 |
| 3M | FPE | 200 | 0.10 | 0.07 | 0.05 | 0.05 |
| HCC | SIXEF | 200 | 0.45 | 0.50 | 0.58 | 0.62 |
| Maxdem | Polyquinoline | 200 | 1.58 | 0.98 | 0.66 | 0.25 |
| Dow Chemical | PBO Mol. Comp. | 200 | 3.23 | 2.55 | 2.24 | 1.89 |
| Foster-Miller | PBZT | 225 | 0.27 | 0.20 | 0.19 | 0.15 |
| 3M | FPE | 225 | 0.14 | 0.06 | 0.06 | 0.04 |
| HCC | SIXEF | 225 | 0.36 | 0.46 | 0.53 | 0.64 |
| Maxdem | Polyquinoline | 225 | 2.05 | 1.64 | 1.26 | 0.48 |
| Dow Chemical | PBO Mol. Comp. | 225 | 6.07 | 3.80 | 3.06 | 2.38 |
| Foster-Miller | PBZT | 250 | 0.37 | 0.27 | 0.25 | 0.12 |
| 3M | FPE | 250 | 0.23 | 0.09 | 0.07 | 0.04 |
| HCC | SIXEF | 250 | 0.40 | 0.40 | 0.47 | 0.64 |
| Maxdem | Polyquinoline | 250 | 2.5i | 2.27 | 1.07 | 1.08 |
| Dow Chemical | PBO Mol. Comp. | 250 | 9.26 | 6.06 | 4.89 | 3.45 |
| Foster-Miller | PBZT | 300 | 0.89 | 0.42 | 0.35 | 0.30 |
| 3M | FPE | 300 | >1 | 0.86 | 0.37 | 0.06 |
| HCC | SIXEF | 250 | >1 | 0.65 | 0.50 | 0.65 |

The superior voltage breakdown strength through the film thickness is attributed to the material itself and to the processing technique that forms a multiaxially oriented film with a high degree of z-direction layering at the molecular level. The top and bottom surfaces of the resulting multiaxial film have a rigid rod or molecular orientation that is set at a +θ and −θ angle to the machine or extrusion direction. The molecular orientation through the thickness of the film generally changes from +θ to −θ, as shown in FIG. 12. It is this structure that results in the molecular level layering believed to provide the superior voltage breakdown properties.

The multiaxially oriented LCPs used in preparing the capacitors described below were prepared by a method in accordance with the Extrusion Process.

The method of reducing ionic contaminants from lyotropic LCP film of this invention comprises washing the film in a surfactant solution. In a preferred embodiment, the method comprises reducing residual ionic contaminants, especially phosphorous content, in a PBO sample by treatment with a nonionic surfactant. In other preferred embodiments, the method further comprises treatment of nonionic surfactant followed by a high-temperature, high-pressure wash.

Polyphosphoric acid is the primary solvent for PBO and PBZT, and the extruded films use a solution of about 10 to 30 percent, preferably 15 percent, PBO in polyphosphoric acid. Room temperature washing of PBO films with deionized water usually leaves up to 0.5 percent of ionic contaminants, more specifically phosphorous, in the films. It is generally believed that these residual contaminants, especially phosphorous, are responsible for the relatively high dissipation factor values previously measured in PBZT films, especially at high temperatures. Preferably the LCP films of the present invention have less than 0.5% residual ionic contaminants and preferably less than 0.01% residual phosphorous.

In a preferred embodiment, the method of decreasing residual ionic contamination in extruded and coagulated lyotropic LCP films is as follows. The duration of washing is selected to bring the ionic contamination to a level acceptable for the intended use of the film. In the case of PBO films for use in a capacitor, the films are preferably initially washed in degassed deionized water at a temperature ranging from about 80 to 95° C., most preferably at a temperature of 90° C. for at least 1 hour and more preferably about 3 hours. During this time, the wash water can be changed as necessary, preferably 2–3 times. The exchanges are preferably conducted so as to limit PBO film exposure to air to 3 to 5 sec. Exposure to air is preferably minimized because the open-pore structure of the water-swollen PBO film will collapse over a period of several minutes on exposure to air. If the film were to collapse in this process, any residual phosphorous remaining in the film becomes trapped.

Following the water wash, the PBO films are then preferably washed in a surfactant solution. Any non-ionic surfactant can be used that reacts with phosphoric acid and forms anionic phosphate mono or diesters. In the case of PBO, preferably the nonionic surfactant is an allyaryl polyether alcohol, more preferably of the type exemplified by TRITON X-45 and X-100 (manufactured by Rohm and Haas). The TRITON series of nonionic surfactants are prepared by the reaction of actylphenol or nonylphenyl with ethylene oxide. These types of surfactants are commonly referred to as alkylaryl polyether alcohols and have the following general structural formula:

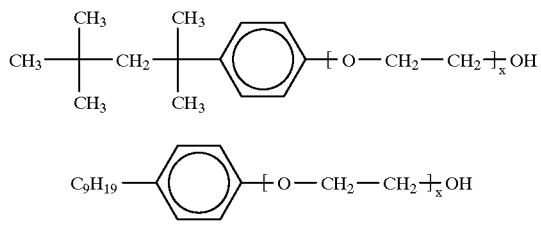

TRITON X-45 and TRITON X-100 belong to the actylphenol series (TRITON X-45, x=5; TRITON X-100, x=9–10) (Rohm and Haas Co.) The following shows the interaction of TRITON nonionic surfactant with polyphosphoric acid to form anionic phosphate mono and diesters:

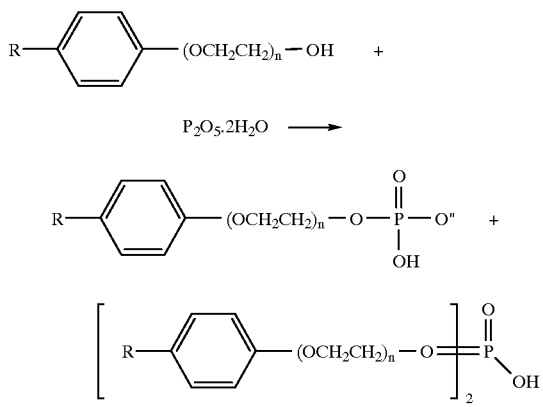

This class of surfactants actively reacts with residual phosphoric acid present within the bulk of the PBO film.

The amount of surfactant in solution can be readily determined. In the case of PBO films, the amount is preferably about 0.1 to 5%, more preferably 0.1 to 1% and most preferably 0.1 to 0.5%. The duration of the surfactant wash will vary. For PBO film processed as described, the wash is desirably for about 1 hour, preferably about 1 to 3 hours and most preferably about 3 hours. The temperature of the surfactant wash is preferably within about 65° C. to 80° C., more preferably within about 70° C. to 75° C., and most preferably at about 75° C. For surfactants that are insoluble in water, such as TRITON X-45, it is preferable to follow the surfactant wash with an inorganic solvent wash, using for example, but not limited to, an aliphatic alcohol such as ethanol or methanol. The concentration of solvent is preferred to be in the range of 40% to 60%, and most preferably around 50%.

In other embodiments, as a final step it is preferred to wash the films in a high temperature, high pressure deionized water wash. The pressure of the wash is preferably in the range of about 0 to 2 atm and most preferably at a pressure of about 2 atm. The temperature of this wash is preferably at from about 80° C. to about 120° C. and most preferably at about 120° C.

PBO films washed with each of the steps described above showed residual phosphorous content of 60 ppm, about two-orders of magnitude less than room temperature-washed films.

The following specific examples of capacitors are intended to illustrate more fully the nature of the invention without limiting its scope. All multiaxially oriented lyotropic LCP films used in the following examples were manufactured according to a procedure utilizing the five step processing cycle generally described below:

1) Homogenization, Degassing and Filtering—As received, polymer is well mixed in a twin screw extruder where it is exposed to a pressurization, depressurization, and vacuum cycle to remove residual gas and then filtered to removed particulates.

2) Film Extrusion—Homogenized and degassed polymer is heated, shear thinned, and multiaxially-oriented into extruded film using a unique dynamic extrusion die.

3) Coagulation—Multiaxially-oriented film is immersed in water to initiate polymer deportation which allows the lyotropic LCP to come out of solution and form its fibril structure. This processing step also provides an initial level of strength to the film which is essential in supporting the downstream handling requirements.

4) Washing—Coagulated film is immersed in a flow-through water bath to remove the phosphoric acid.

5) Drying/Heat Treating—Washed film is exposed to a controlled sequence of heating cycles under multiaxial stress to remove the water and maximize film physical properties.

In some embodiments, the films were further washed as taught herein to reduce ionic contaminants.

The apparatus used to perform the initial homogenization, degassing and filtering function is illustrated in FIG. 13. LCP stored in a feed pot 20 is fed into the twin screw extruder 21 by a pressurized piston 22. Inside the extruder, the LCP passes through a mixing zone, two pressurization-depressurization-vacuum zones, and a compression/metering zone. The degassed LCP passes through a 5-μm filter 23 and into a collection pot 24 which is maintained under vacuum 25.

Figure 14:
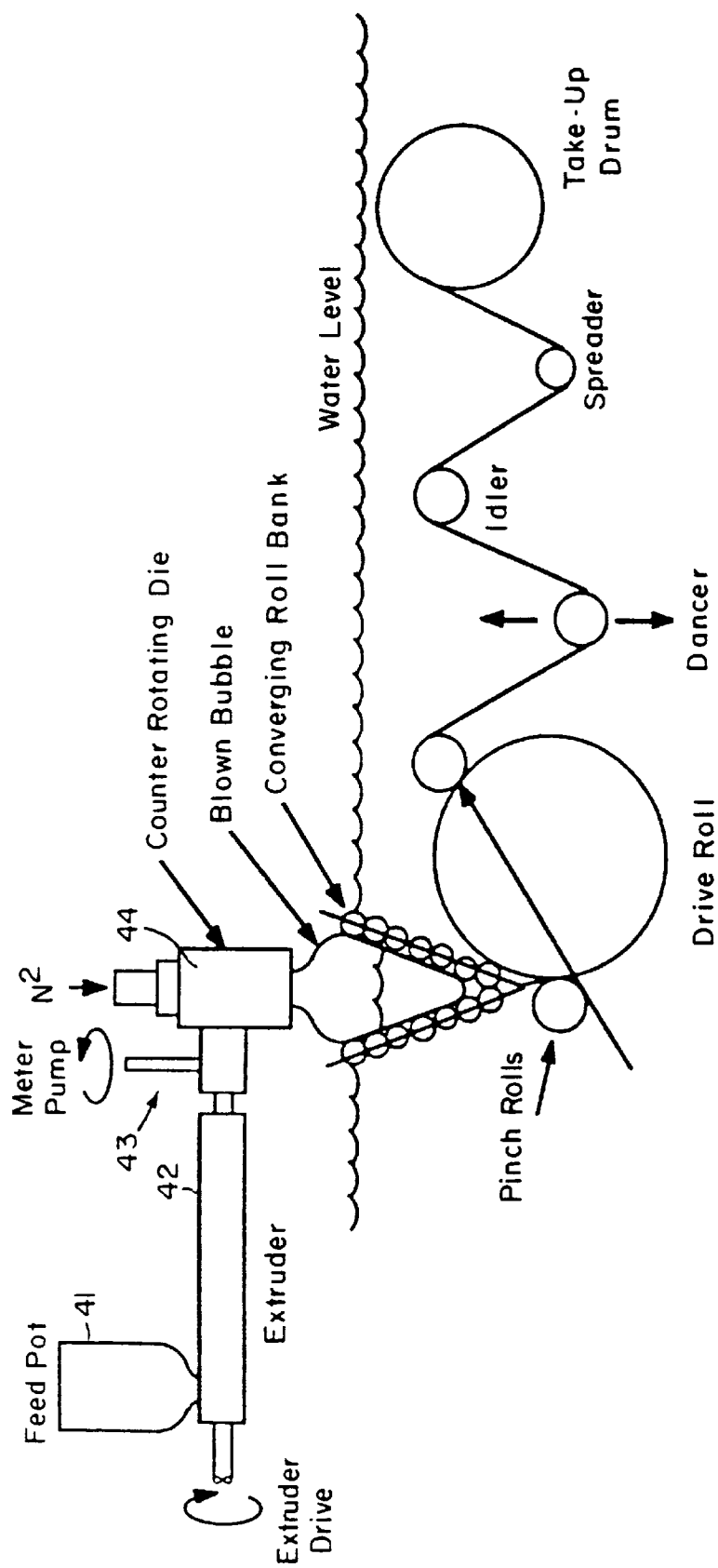
FIG. 14 is a schematic diagram of the biaxial film extrusion and coagulation equipment for processing multiaxially oriented LCP film.
Figure 15:
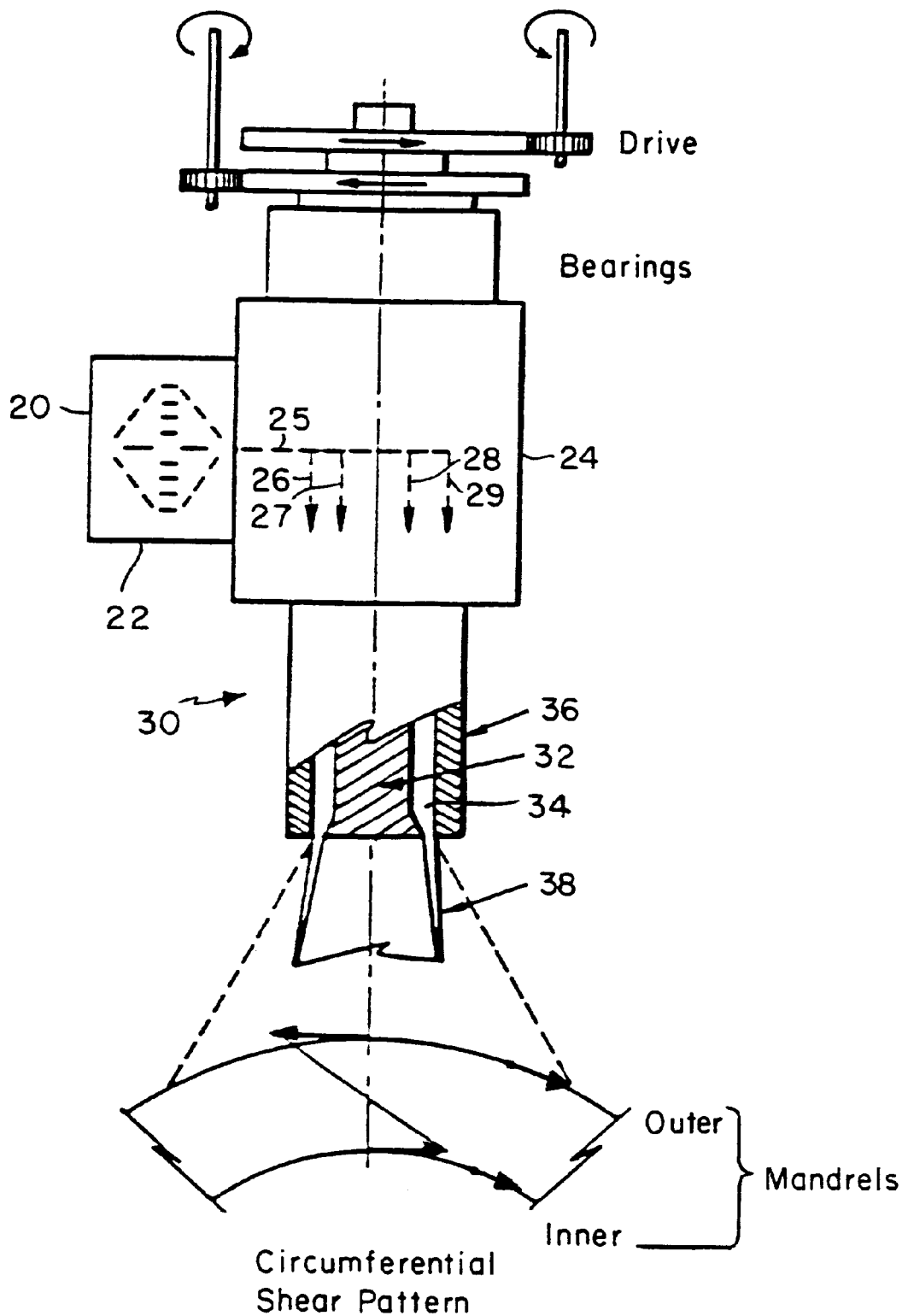
FIG. 15 is a schematic diagram of a counter-rotating die.
Figure 16:
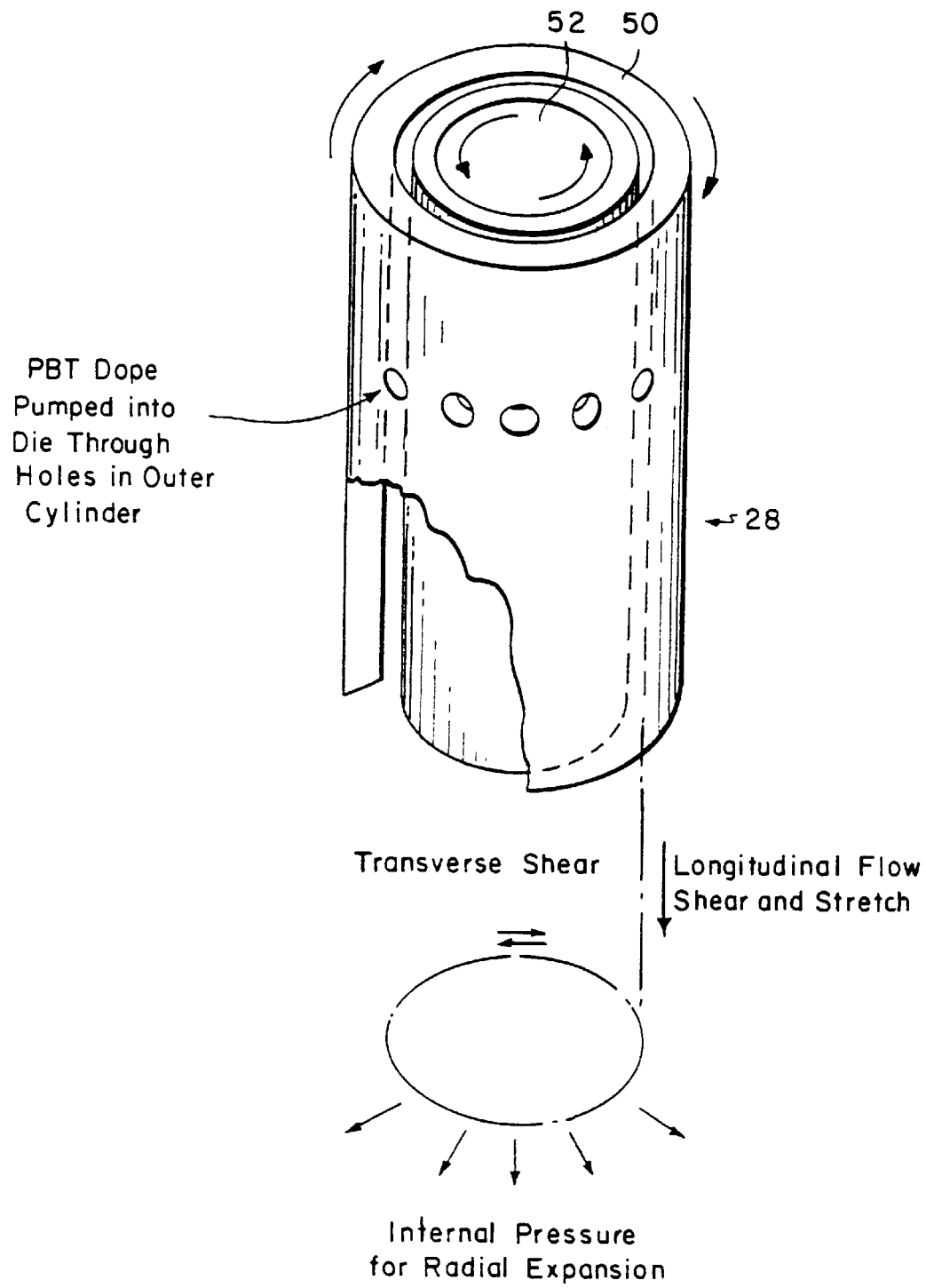
FIG. 16 is a schematic representation of the mandrels of a counter rotating tube die apparatus for producing a multiaxially oriented film from an ordered polymer.

As illustrated in FIG. 14, LCP is fed from a piston-driven feed pot 41 into a single screw extruder 42 where it is reduced in viscosity. A metering pump 43 on the discharge side of the extruder is used to accurately control the LCP feed rate to the counter-rotating die 44. The counter-rotating die with its counter-rotating concentric mandrels (as shown in FIG. 15) is the key component in creating the multiaxial orientation. The film die, as shown in FIG. 16 has two counter rotating barrels, 50 and 52 respectively, whose purpose is to create a shear field through the cross section of the extruded dope composition.

A combination of shearing and stretching of the counter-rotating dies used in the Extrusion Processes orients the LCP molecules/fibrils. FIG. 15 is a schematic diagram, partly in cross-section, of a die that is particularly adapted to carry out the process of this invention. A flowable ordered-polymer dope is introduced at an inlet 20. The dope is passed through a filter/strainer 22 which is of any suitable type and need not be discussed further at this point. The dope then passes through a distribution block 24 having a main distribution channel 25 and a group of secondary distribution channels 26–29. A die assembly generally designated 30 comprises two tubular mandrels, an inner mandrel 32, and an outer mandrel 36. A cylindrical inner space or annulus 34 is defined between the mandrels 32 and 36. The circumferential shear pattern of the resulting film 38 is illustrated at the bottom of FIG. 15.

The angle that the LCP fibrils make with the longitudinal axis of the tubular extrudate or film can be readily varied from ±5 to ±70 degrees to form multiaxially oriented film. The rotation of the counter-rotating mandrels creates transverse shear flows that are superimposed on the axial shear developed as the polymer melt is extruded through the die. This operation presets the multiaxial orientation.

As shown in FIG. 14, the combination of counter-rotating shearing within the die followed by blowing (formation of a bubble) 35 and stretching the LCP tubular extrudate after exiting from the die develops the desired multiaxial, e.g. biaxial, orientation. The oriented bubble quickly is immersed into water 36 where it readily coagulates into a relatively tough structure which can be handled for later processing without damaging the film. As the film is coagulated it passes through a series of rollers 37 onto a take-up drum 38. This drum can then be transferred to the washing station for removal of the phosphoric acid.

The counter-rotating annular die extrudes PBZ film having a controlled in-plane multiaxial, e.g., balanced biaxial molecular orientation. It was found that film having balanced in-plane properties (equal values in any polar direction), has a tendency to curl. To reduce this curling, a tri-axial die has been used that produces multiaxially oriented film that has through the thickness symmetry in a single extrusion process. This process produces non-curling LCP film for use as electrical substrates.

Figure 17:
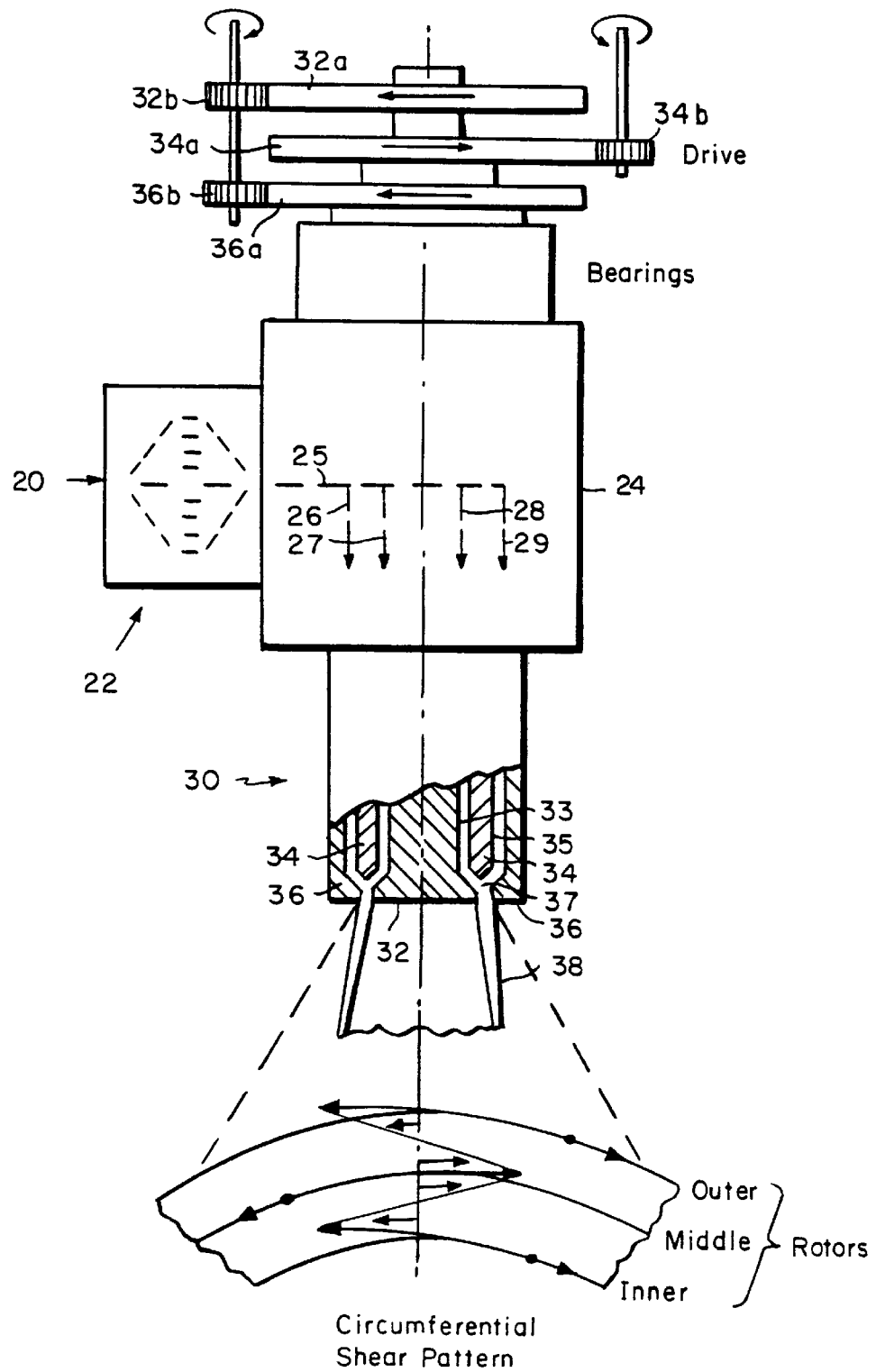
FIG. 17 shows a triaxial (three annulus) die.

FIG. 17 shows an example of a tri-axial die which is a modification of the counter rotating die shown in FIG. 15. Only the portions of this die which differ from those in the first die will be discussed, to eliminate redundant explanation.

A die assembly generally designated 30 comprises three tubular rotors, an inner tubular rotor 32, a middle tubular rotor 34, and an outer tubular rotor 36. A cylindrical inner space or annulus 33 is defined between the rotors 32 and 34. Similarly, an outer annulus 35 is defined between the rotors 34 and 36.

After passing through the annuli 33 and 35, the two layers of the extruded dope are joined in an exit space 37 which is defined below the rotor 34 and between the lower portions of the rotors 32 and 36.

In this diagram, the lowermost edge of the rotor 34 has a downward-pointed shape which corresponds to the shapes of the facing inner surfaces of the rotors 32 and 36, so that the thickness dimension of the space 37 is substantially the same as that of the annuli 33 and 35. However, this arrangement is not essential. Other examples of advantageous structures can be found by experimentation.

As a result of the joining of the respective ordered-polymer flows in the space 37, a tubular film 38 is formed and extruded downwardly, and outwardly of a channel 40 through which air is conducted for blowing the film. A rotary fitting can be provided, for example, at some point along the channel 40 for introducing the blowing air. The inner and outer rotors, 32, 36 are rotated in a first direction, for example, clockwise as seen from above in this example. The intermediate rotor 34 is rotated in the opposite direction, namely counterclockwise as seen from above in this example. The circumferential shear pattern of the resulting film 38 is illustrated at the bottom of FIG. 15. As shown, the facing layers of the polymer flows in the annuli 33, 35 are sheared in the second direction by the rotation of the middle rotor 34, so when joined in the space 37, these surfaces combine to form a central portion of the resulting film which thus is oriented strongly toward the second direction. Conversely, the rotation of the inner and outer rotors causes the inner surface of the flow in the annulus 33, and the outer surface of the flow in the annulus 35, to be oriented in the first direction. These two layers form the outer layers of the resulting film.

It should be understood that the circumferential shear pattern illustrated at the bottom of FIG. 17 has a combined effect with the longitudinal shear pattern in the machine direction which results from the downward movement of the polymer flows toward the exit space 37. This longitudinal shear will be the same at each interface, between the polymer flows in the annuli 33, 35, and the rotors 32, 34, 36.

Certain modifications to the Extrusion Processes were made to achieve LCPs to be used in accordance with the present invention. Table 3 summarizes the modifications to the lyotropic film system and their effects on the film characteristics. The film uniformity was improved by employing a bifurcated die entry, feedback control system for the pumps, mandrels, and take-up (instead of using difficult to control potentiometers), improving the controls on the feed pot and flow meters for blowing the bubble, and installing a Teflon sizing ring.

TABLE 3

Improvements to Lyotropic Film System

| Improvement | Effect |
| --- | --- |
| Degassing/Homogenizing | Improvement mainly in the film clarity and homogeneity |
| Filtering | Using 5- or 10-$\mu$m filter during degassing has no effect on values, but improves the dope homogeneity with fewer particulates |
| Bifurcated die entry | Provides more uniform flow of dope through die; reduces runout |
| Controlled pressure to feed ram | More uniform flow to gear pump and pressure in extruder |
| Feed pot temperature controller/readout | Better flow to extruder |
| Improved $N_2$ flow meters | More sensitive bubble control |
| Smart system | Feedback control to all motors (mandrels, pumps, take-up) |
| Teflon sizing ring | Reduces bubble wander and controls diameter. Improves film uniformity |
| Water in take-up tank (and inside bubble) | Deaerated, filtered, deionized warm water reduces surface flaws |

One of the most important of the above-mentioned modifications for controlling the axial and circumferential uniformity of the extruded film is the installation of a Teflon sizing ring. This ring is used to better control the bubble blowing process. The sizing ring is placed at the water line, where the bubble was already fully formed. To ensure constant diameter, the film bubble is blown against the wall of the Teflon ring. The use of the Teflon ring also contributes to a more stable film bubble during extrusion, which, in turn, results in fewer film wrinkles. A reduction in diameter variation corresponds directly to a reduction in final dry film axial thickness variation. The installation of the sizing ring decreases the standard deviation in film thickness for PBO film processed. By this measure the ±22.5°-film uniformity increased more than 50 percent, from a thickness variation of 17 percent to only 8 percent after installation of the Teflon ring.

The films used in the following examples were manufactured from PBO dope, a solution of PBO in phosphoric acid, (Dow Chemical Corp., Midland, Mich.). Unless otherwise indicated, the PBO films had a biaxial orientation of from about ±40° to about ±45° of machine direction and were washed, according to the method of the present invention, to remove the residual ionic contaminants.

EXAMPLE 1

Flat-Plate Capacitor Design (a) Electrical Design

The following design is applicable to both 150-$\mu$F capacitors and 1-$\mu$F capacitors. To maintain the resistance of the power foils at less than 0.3 m$\Omega$ in the 1-$\mu$F capacitor the power foil thickness was preferably 0.002 inches or greater. For the 150-$\mu$F capacitor the power foil thickness could be as small as 0.0001 inches.

The properties of the particular PBO film determine the dielectric thickness. As the film becomes thinner, the number of layers required for a given capacitance is reduced. It is preferable to use the thinnest dielectric film that can withstand about 400V at about 300° C. in the capacitor. The film used in a representative capacitor of this invention was about 5.0$\mu$ thick.

Figure 2:
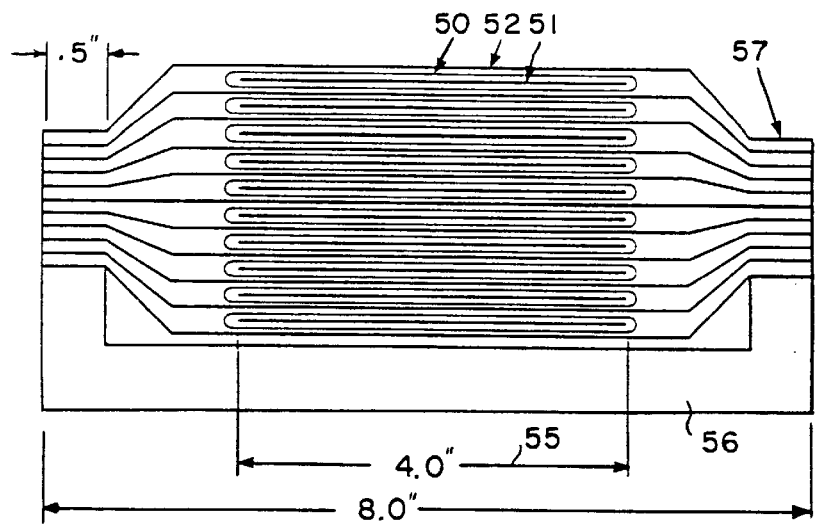
FIG. 2 is a schematic of the cross section of one capacitor of the present invention showing lay-up details.

For this representative capacitor, the dielectric area was 4 in×4 in. FIG. 2 illustrates the lay-up procedure. The tendency of multiaxially oriented PBO films to roll up can be overcome by utilizing cylindrical tubes of PBO film 50, cut to the desired length. For example, a 4 inch wide by 8 inch long aluminum power electrode 51 was pushed through the PBO tube until 2 inches of foil extended beyond each end of the tube. This sandwich of PBO-AL-PBO was then placed in the capacitor lay-up frame 56. The ground foil 52, 4 inch wide by 8 inch long in this example, was laid across the dielectric. The ends of the ground foil were clamped using a ground clamp 57. The active dielectric area was the overlap area of the power and ground foils 55, in this example, 16 in$^2$.

The power dissipation of the dielectric is calculated using the following equation:

$$P(\text{watts}) = 2\pi F\ U\ (DF)$$

where:
DF=the dissipation factor
F=the frequency of operation
U=the peak energy stored per cycle.

$$U = \tfrac{1}{2}\ CV^2_{peak};\ C = k_o k\ A/t$$

where:
k is the dielectric constant or permittivity, A and t are the area and the thickness of the dielectric, respectively.

As the equation shows, the power dissipation of the capacitor is a function of the capacitance and the dissipation factor for fixed operating conditions. The power generated per layer is simply multiplied by the number of layers to determine the total heat generated in the capacitor. A 1-$\mu$F capacitor prepared according to this example generated about 1 W and a 15-$\mu$F capacitor generated about 140 W of power for the measured values of DF for PBO films at 300° C. These figures were used in the thermal analysis to determine temperature rise with various designs.

(b) Thermal Design

Figure 3:
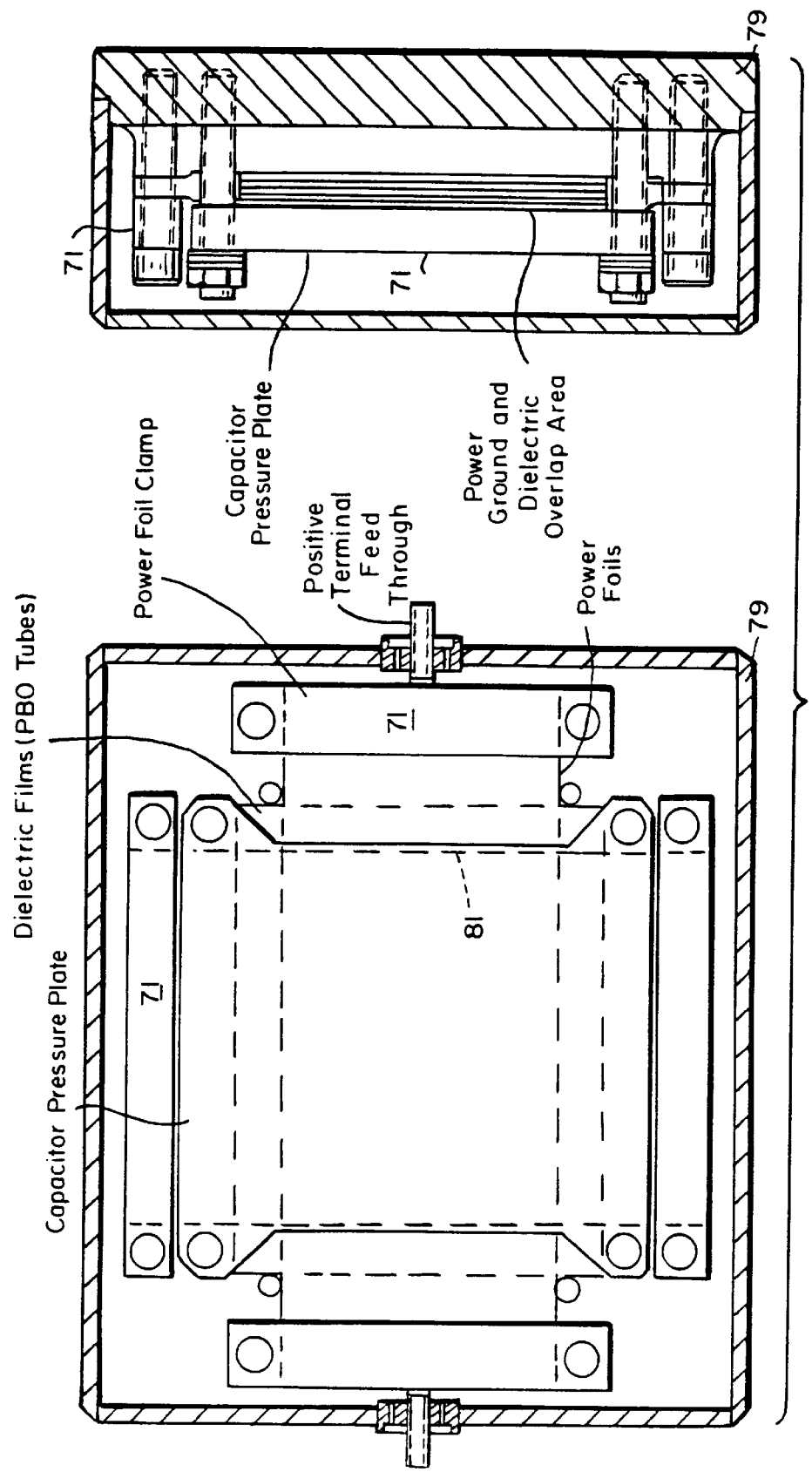
FIG. 3 is a schematic showing assembly details of high temperature capacitor fixture.
Figure 21:
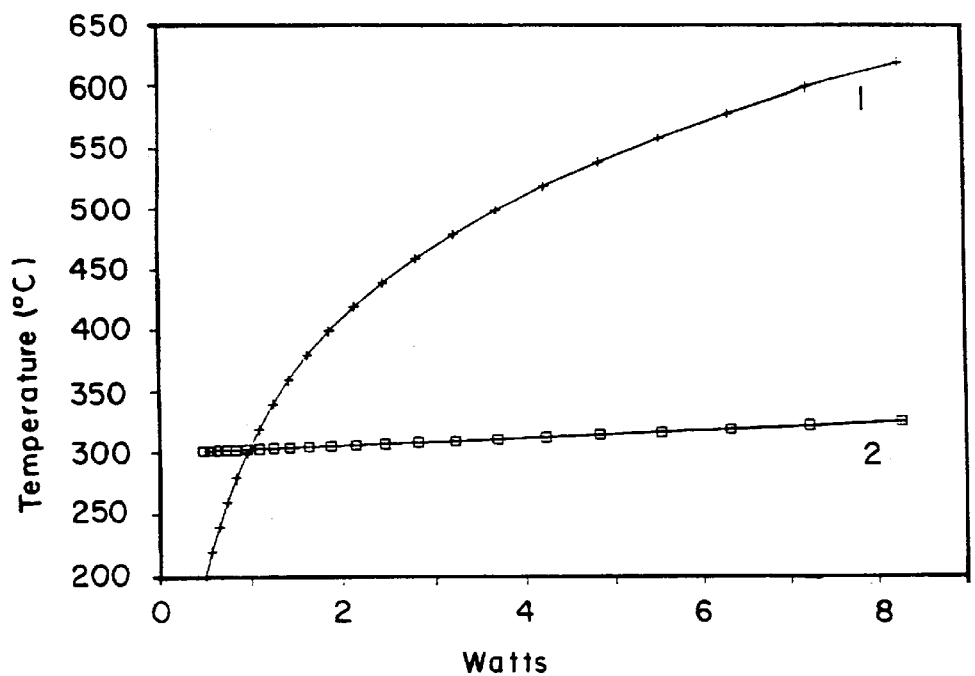
FIG. 21 is a graph of heat dissipation vs. thermal resistance showing the thermal design of the 1-$\mu$F capacitor comprising a biaxially oriented lyotropic LCP film.
Figure 22:
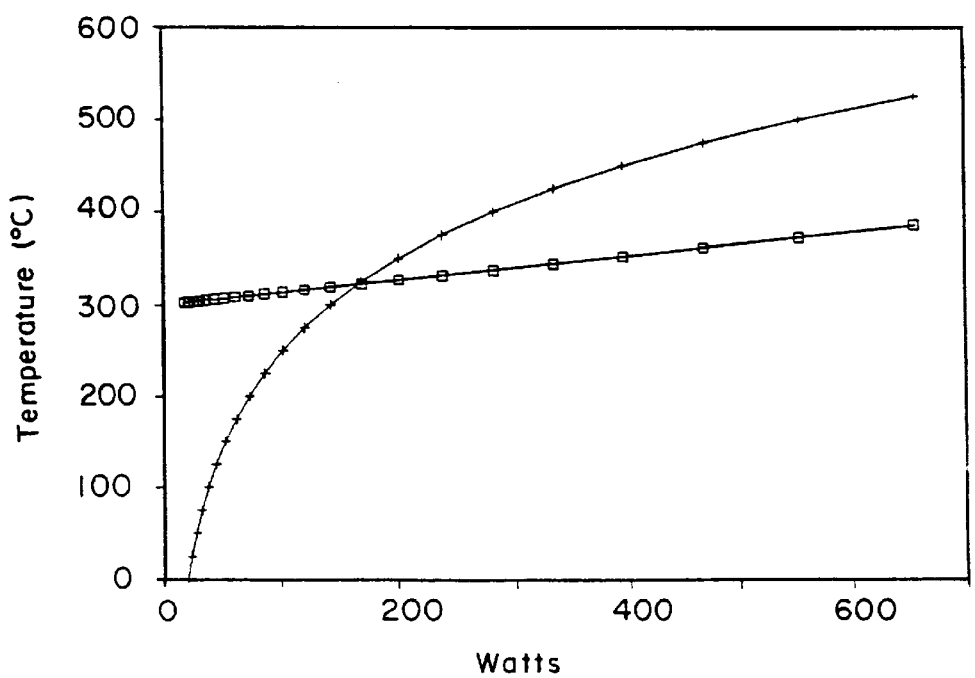
FIG. 22 is a graph of heat dissipation vs. thermal resistance showing the thermal design identifying the operating temperature of a 150-$\mu$F capacitor of the present invention comprising biaxially oriented PBO film.

The thermal performance of the capacitor determines the design of the ground foils, the base plate, the sealed can, and the cold plate junction. For an ambient temperature of 300° C., it is preferable to minimize the thermal impedance of the system and use the lowest dissipation factor material. FIG. 3 shows a schematic cross section of a capacitor designed using LCPs. The three main sources of thermal impedance are the ground electrode foils, ground clamp 71 and base plate 79. To overcome increases in temperature in the capacitor due to thermal impedance, aluminum ground foils 81 were preferably butted to an end plate and clamped together. All the heat was conducted through the end plate, thereby eliminating the contact resistances between the ground foils. The thermal impedance of the clamp remained independent of the number of layers. (The temperature rise would be proportional to the number of layers). FIG. 21 shows the results of the thermal analysis for a 20 layer 1-$\mu$F capacitor. The intersection of the two curves indicates the expected operating temperature of the capacitor. The first curve (curve 1) denotes the amount of heat generated (in watts) as a function of temperature. The nonlinear dependence is due to the increase in dissipation factor as a function of temperature. The second curve (curve 2) demonstrates the temperature rise as a function of the heat generated. This curve is linear since the thermal impedance is constant with the modified clamp design. The operating temperature of the 1-$\mu$F capacitor was only a few degrees above the ambient temperature. FIG. 22 summarizes the calculations for a 3,000 layer, 150-$\mu$F capacitor. With the above design, this capacitor was expected to operate at about 25° C. above the ambient temperature of 300° C. All these designs assume that the baseplate can be maintained at the ambient temperature of 300° C.

The following additional features were designed into the capacitors used in these examples. The capacitor was preferably manufactured from aluminum 6061, because of its light weight, with alignment pins, which allow accurate lay-up of films. An integral pressure plate was used to impose a uniform pressure on the dielectric films. Integral ground foil clamps produce low thermal impedance to the heat sink. The power foil clamps were designed for minimum electrical resistance and were insulated from the base by a ceramic plate. The capacitor area was raised to ensure lay-up without shorting. A high-temperature seal was designed for a pressure differential of 13 psi at room temperature and 2 psi at 300° C. A high temperature hermetic seal for the positive terminal of feed through enabled use at 300° C. The capacitor was back filled with an inert gas and hermetically sealed.

(c) Results

Figure 4:
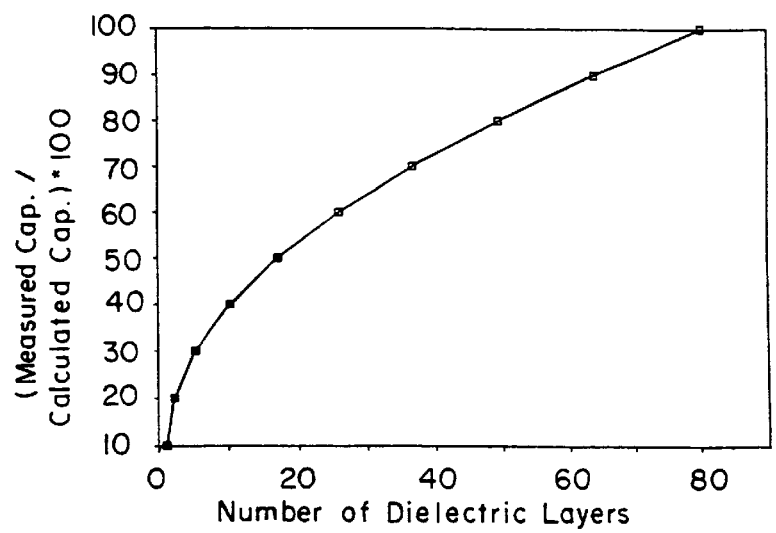
FIG. 4 is a graph of capacitance yield as a function of number of dielectric layers of PBO film (extrapolated beyond 20 layers).

Several capacitors were fabricated using washed, biaxially oriented PBO film, and tested for dc resistance and capacitance. The capacitor design was a flat-plate structure with alternating layers of power-dielectric-ground. The fixture used a pressure plate with compression springs that allowed the pressure on the capacitor stack to be adjusted from 2 psi to 50 psi. Low capacitance values were attributed to air gaps or voids between the dielectric layers and the electrode foils. As the number of layers increased, more dielectric material was available to fill these voids. Capacitors up to 20 layers thick were fabricated and tested. FIG. 4 shows the percent of expected capacitance or "capacitance yield percentage" (defined as the measured capacitance divided by the calculated capacitance) as a function of the number of dielectric layers. The data beyond 20 layers was extrapolated to generate a curve fit to the first five data points. It shows that 80 layers should yield 100 percent of the calculated capacitance.

Figure 5:
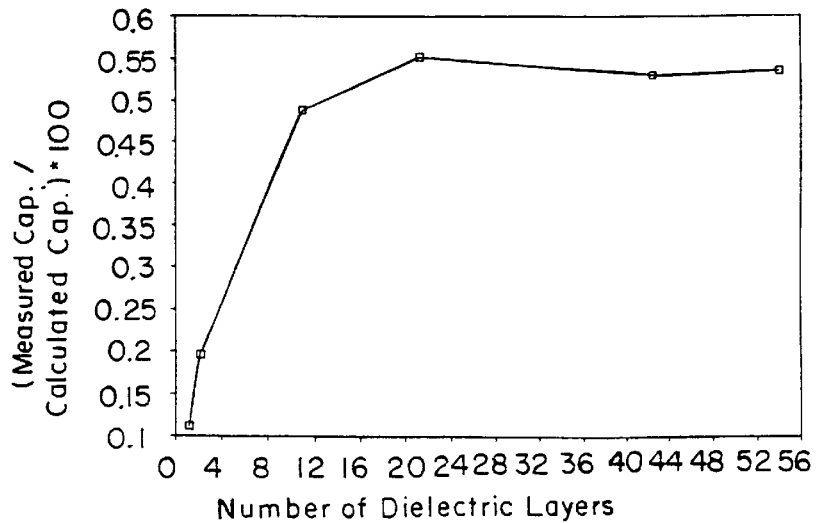
FIG. 5 is a graph of measured capacitance yield as a function of number of dielectric layers.

Capacitors having 40- and 50-layers of biaxially oriented PBO dielectric material were fabricated and tested for capacitance yield. At 50 layers, the calculated capacitance value was 2 $\mu$F. The capacitance of the 50-layer capacitor was 50 percent of the predicted value, or 1 $\mu$F. FIG. 5 shows the capacitor yield data for capacitors up to 50 layers and demonstrates that the capacitance value obtainable is up to 50 percent of the extrapolated value. While the inventors do not intend to be bound by theory, it is believed that the yield was less than 100 percent due to gaps between the layers.

Capacitor yield as a function of thicknesses of PBO film was checked on the capacitor fixture. The capacitor fixture is designed to use foil electrodes made of aluminum for power and ground. Use of the foil electrodes increases the thermal performance of the capacitor. A potential problem with using foil electrodes in the capacitor, however, is the possibility of dielectric film puncture due to particles or burrs in the metal foil. The yield of various thicknesses of films and their resistances to puncture when laid up in the fixture were tested for use with metal foils. Films of thicknesses of 0.14, 0.22 and 0.45 mils were mounted in the capacitor fixture and tested for dc resistance and capacitance. Table 2 shows that none of the films showed signs of breakdown in dc resistance due to puncture by particles or burrs in the foil. Therefore, there was no correlation between film thickness and the yield of the PBO dielectric film. The major advantage of using 0.1-mil film over 0.2-mil film is only half as many layers are required to achieve the same capacitance value.

TABLE 4

Summary of Tests on Two-Layer Capacitors to Determine Yield

| Film Thickness (mils) | Standard Deviation (mils) | No. Samples Tested | Yield (%) |
|---|---|---|---|
| 0.22 | 0.04 | 5 | 100 |
| 0.14 | 0.02 | 4 | 100 |
| 0.45 | 0.10 | 5 | 100 |

(d) Metallized Films

The capacitance yield was further increased by using metallized LCP films instead of foils. One side of the film was metallized to keep the breakdown voltage at 500V. The biaxially oriented PBO film was metallized with gold according to methods known in the art. Two-layer capacitors were constructed according to the above design and tested.

Figure 8:
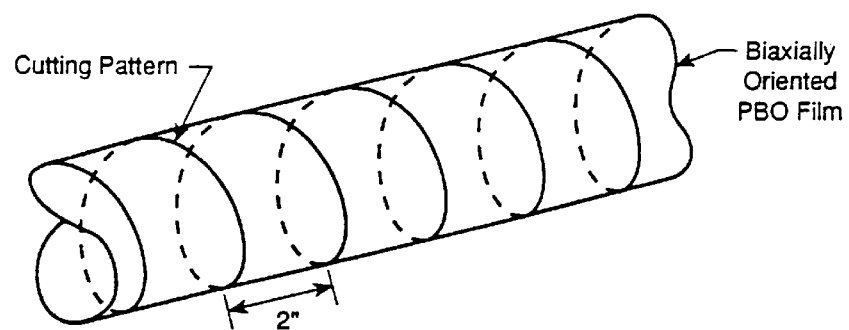
FIG. 8 is a schematic showing the technique to yield 12-ft rolls of biaxially oriented PBO film from 3-ft tubes cutting along a helical pattern.

The measured capacitance of the capacitors was 40 to 60 percent of the calculated values with the dielectric metallized on one side. This was 100 percent greater than previous results using nonmetallized film with two layer capacitors as shown in FIG. 8. FIG. 4 shows that a two-layer capacitor using nonmetallized film has a yield of about 20 percent. The use of metallized film enables capacitors to be made using fewer layers of dielectric.

(e) Temperature tests

Another design of a capacitor of this invention incorporates several modifications to the design of the capacitor previously described. This design includes a power clamp to handle either metallized films or foils. When ground foils are used, the ground foils are inserted through the dielectric tube and the outer edges of the film are clamped in the power electrode. Any high temperature material can be used as a base material for this capacitor. Stainless steel is the preferred base material due to its high strength and high modulus at high temperature. As a result, a thinner base can be made. Stainless steel is also safe against pressure buildup at the operating temperatures of the capacitor.

Capacitors were fabricated and tested according to this design. One capacitor (No. 3) contained a total of 20 layers of foils with a single sheet of biaxially oriented PBO film between the foils. Its capacitance remained stable at 0.35 $\mu$F in the frequency range of 100 Hz to 100 kHz, up to 200° C.

Figure 6:
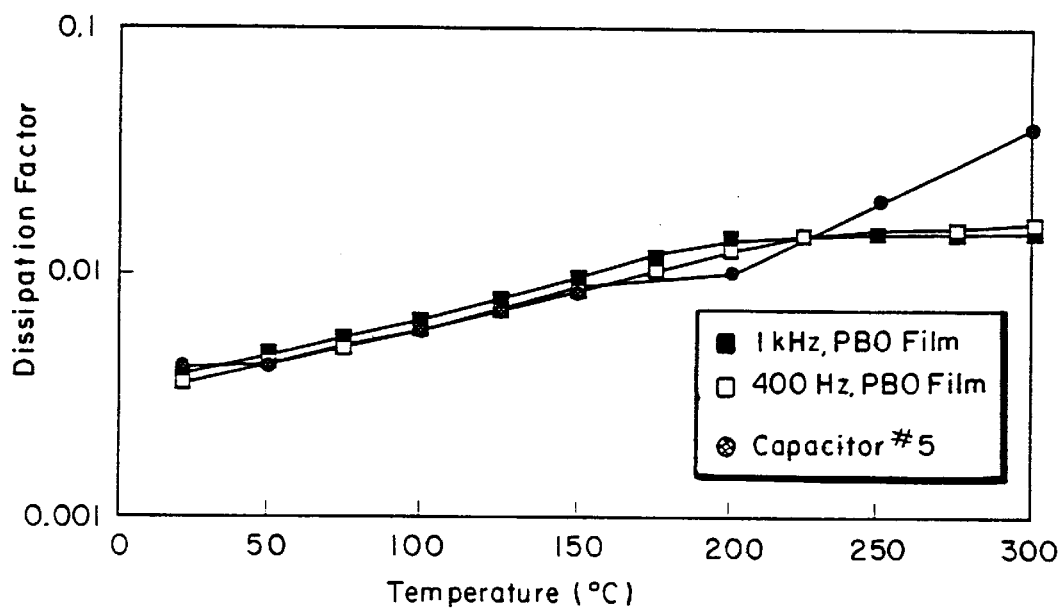
FIG. 6 is a graph of dissipation factor versus temperature of biaxially oriented PBO film and the 10-layer capacitor (capacitor no. 5, described below) fabricated with two layers of film between foils.

Another capacitor (No. 5) was fabricated using two sheets of PBO film as the dielectric between foils. The 10-layer capacitor had a value of 0.07 $\mu$F, and remained stable up to 300° C. Its dissipation factor remained below 0.05 at 300° C. and 400 Hz. These results are summarized in FIG. 6.

(f) Sealed capacitors

The capacitors used in the following example were sealed after filling with an inert gas. Sealing the capacitor protected the capacitor and increased its useful life while not affecting the electrical properties of the capacitor. Any inert gas can be used for sealing; nitrogen was used in these capacitors. The capacitors were designed to contain a valve which was used to evacuate and backfill the capacitor with the gas after welding the end plates and cover plate. Any procedure known in the art can be used which will seal the capacitor, but the following was used in this example: an oven was heated to 300° C.; the capacitor was placed inside the oven and the vacuum plug loosened; the capacitor was evacuated and back filled with $N_2$ several times; the capacitor was removed from the oven and the plugs tightened and sealed. This procedure also allowed the capacitor's internal pressure to be approximately one atmosphere at the anticipated operating temperature. At room temperature, its internal pressure was estimated to be around 8.9 psia.

Figure 7:
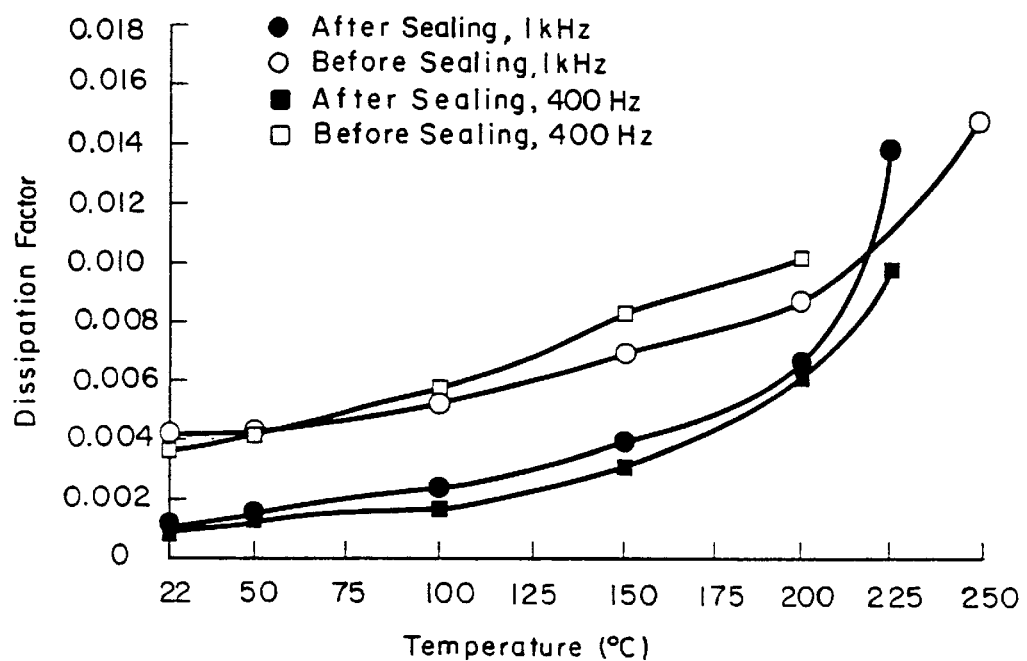
FIG. 7 is a graph showing the effect of sealing on dissipation factor for capacitor (capacitor no. 5, described below).

The dissipation factor as a function of temperature was measured for two capacitors and is shown in FIG. 7 for capacitor No. 5. Although the values remained identical at low temperatures and low frequencies, the sealed capacitors exhibited higher than normal dissipation factor values at high frequencies and high temperatures. These measurements were performed with only room temperature open and short circuit compensation.

The fabrication of several capacitors with this design clearly established that the design was suitable for 300° C. operation.

EXAMPLE 2

Roll-Film Capacitors

Roll-film capacitors were manufactured from tubes of biaxially oriented PBO films substantially as follows, unless otherwise indicated. For example, three foot length tubes PBO films were preferably cut into thin strips of about 2 inches wide in a helical pattern as shown in FIG. 8. This procedure produced films of about 12 feet in length. This film was then used to fabricate wound filter capacitors according to methods known in the art.

Figure 9:
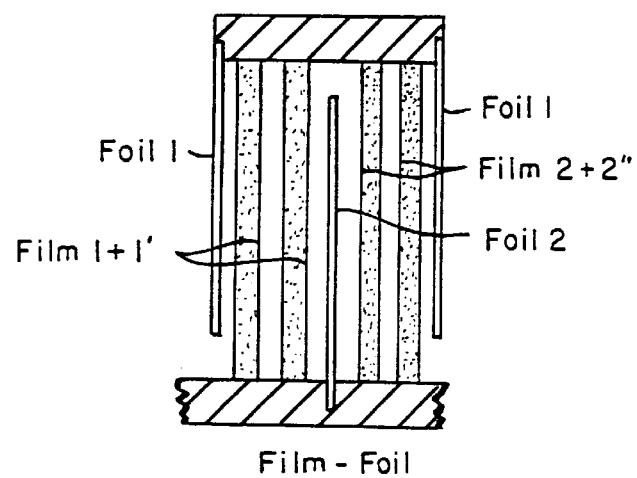
FIG. 9 is a diagram of film-foil capacitor dielectric-electrode winding arrangements.

Capacitors to be tested were manufactured according to the following method. The film-film-foil windings had an extended foil structure type as shown in FIG. 9. The electrodes were connected to the terminals through zinc end-sprays applied to the capacitor winding ends. The windings were made in a Barton winder. It produces winding after winding without interruption. A winding consist of successive layers of two films, a foil, two films, and a foil which were wound on one of the two mandrels on this machine. When one winding was completed, the next winding was started on the other mandrel. An essential feature of the windings was that the outer turns and the inner turns were inactive, without foil, to protect the winding from damage from the outside, and to avoid wrinkling and loosening of the inner core turns. When a winding approached completion, the winding speed decreased, and in succession, the foils were perforated, and clamped several inches away from the perforation so that they broke at the perforation. A small length of each foil was left loose beyond each clamp. The outer turns were completed without foil, these four layers of film were cut, and the other mandrel started the next winding with only the four layers of the film. All this occurred at the slow winding speed. When there were enough inactive turns, the clamps holding back the foil opened up and the dangling foil ends were picked up and fed into the winding together with the films. Winding then proceeded at a high speed.

Capacitors were manufactured according to this process. The capacitors were not sealed. The capacitance and dissipation factors of these capacitors were measured up to 300° C., in the frequency range of 100 Hz to 10 kHz. The capacitance values are summarized in Table 5. These capacitors remained stable up to 300° C., showing about 9% increase over room temperature. This change may have been due to changes in the winding spacing as temperature increases. The films did not show any temperature dependence. If the capacitors were sealed the capacitance would not change with temperature. The capacitance did not show any dependence on frequency from 100 Hz to 10 kHz.

TABLE 5

Capacitance versus Temperature and Frequency of Roll-Film Capacitors

| Cap. No. | Capacitance, μF at 23° C. | | | Capacitance, μF at 148° C. | | | Capacitance, μF at 225° C. | | | Capacitance, μF at 300° C. | | | Capacitance, μF at 23° C. after 300° C. | | |
|---|---|---|---|---|---|---|---|---|---|---|---|---|---|---|---|
| | 100 Hz | 1 kHz | 10 kHz | 100 Hz | 1 kHz | 10 kHz | 100 Hz | 1 kHz | 10 kHz | 100 Hz | 1 kHz | 10 kHz | 100 Hz | 1 kHz | 10 kHz |
| 1 | 0.135 | 0.135 | 0.135 | 0.151 | 0.149 | 0.146 | 0.161 | 0.158 | 0.156 | 0.175 | 0.170 | 0.166 | 0.145 | 0.145 | 0.145 |
| 4 | 0.119 | 0.119 | 0.119 | 0.135 | 0.133 | 0.130 | 0.144 | 0.141 | 0.138 | 0.155 | 0.152 | 0.149 | 0.133 | 0.133 | 0.133 |
| 5 | 0.132 | 0.132 | 0.131 | 0.147 | 0.146 | 0.143 | 0.157 | 0.156 | 0.150 | 0.164 | 0.160 | 0.156 | 0.140 | 0.140 | 0.140 |
| 6 | 0.115 | 0.115 | 0.114 | 0.130 | 0.129 | 0.126 | 0.140 | 0.136 | 0.135 | 0.147 | 0.143 | 0.140 | 0.124 | 0.123 | 0.123 |
| 7 | 0.105 | 0.105 | 0.104 | 0.118 | 0.117 | 0.115 | 0.127 | 0.124 | 0.123 | 0.134 | 0.129 | 0.126 | 0.117 | 0.117 | 0.117 |
| Avg | 0.121 | 0.121 | 0.121 | 0.136 | 0.135 | 0.132 | 0.146 | 0.143 | 0.140 | 0.155 | 0.151 | 0.147 | 0.132 | 0.132 | 0.132 |

Table 6 summarizes the dissipation factor (DF) values over the same temperature and frequency range as in Table 5. The values remained below 1 percent (at 1 kHz) at temperatures up to 300° C., demonstrating the benefits of using this material for operation at 300° C. The DF did not exhibit frequency or sample to sample dependence. The values did increase with temperature but remain lower than most other materials.

TABLE 6

Dissipation Factor versus Temperature and Frequency of Roll-Film Capacitors

| Cap. No. | 100 TAN d at 23° C. | | | 100 TAN d at 148° C. | | | 100 TAN d at 225° C. | | | 100 TAN d at 300° C. | | | 100 TAN d at 23° C. after 300° C. | | |
|---|---|---|---|---|---|---|---|---|---|---|---|---|---|---|---|
| | 100 Hz | 1 kHz | 10 kHz | 100 Hz | 1 kHz | 10 kHz | 100 Hz | 1 kHz | 10 kHz | 100 Hz | 1 kHz | 10 kHz | 100 Hz | 1 kHz | 10 kHz |
| 1 | 0.17 | 0.14 | 0.22 | 0.39 | 0.32 | 0.33 | 0.51 | 0.46 | 0.49 | 1.42 | 0.90 | 0.88 | 0.14 | 0.12 | 0.16 |
| 4 | 0.18 | 0.15 | 0.23 | 0.38 | 0.31 | 0.32 | 0.68 | 0.54 | 0.51 | 1.43 | 0.82 | 0.78 | 0.14 | 0.12 | 0.14 |
| 5 | 0.18 | 0.15 | 0.16 | 0.39 | 0.32 | 0.29 | 0.76 | 0.60 | 0.52 | 1.12 | 0.82 | 0.75 | 0.15 | 0.13 | 0.15 |
| 6 | 0.16 | 0.14 | 0.17 | 0.30 | 0.29 | 0.28 | 0.74 | 0.61 | 0.56 | 1.33 | 0.83 | 0.78 | 0.14 | 0.13 | 0.20 |
| 7 | 0.19 | 0.16 | 0.16 | 0.36 | 0.28 | 0.29 | 0.77 | 0.62 | 0.52 | 1.30 | 0.85 | 0.76 | 0.16 | 0.14 | 0.15 |
| Avg | 0.18 | 0.15 | 0.19 | 0.36 | 0.30 | 0.30 | 0.69 | 0.57 | 0.52 | 1.32 | 0.84 | 0.79 | 0.15 | 0.13 | 0.16 |

These results shown in Tables 5 and 6 indicate the remarkable benefits of using LCP films as the dielectric material in high energy density and high temperature capacitors.

EXAMPLE 3 a) The following example demonstrates the effect of surfactant and high-temperature, high-pressure washing on the electrical qualities of the film.

Five PBO tubes were initially washed in degassed deionized water at 80 to 95° C. for 3 hr. During this time, the entire volume of the wash water was changed three times. Unless otherwise indicated, the temperature of each was 80 to 95° C. These procedures are merely examples of various wash techniques and are not intended to limit the process of this invention.

Figure 18:
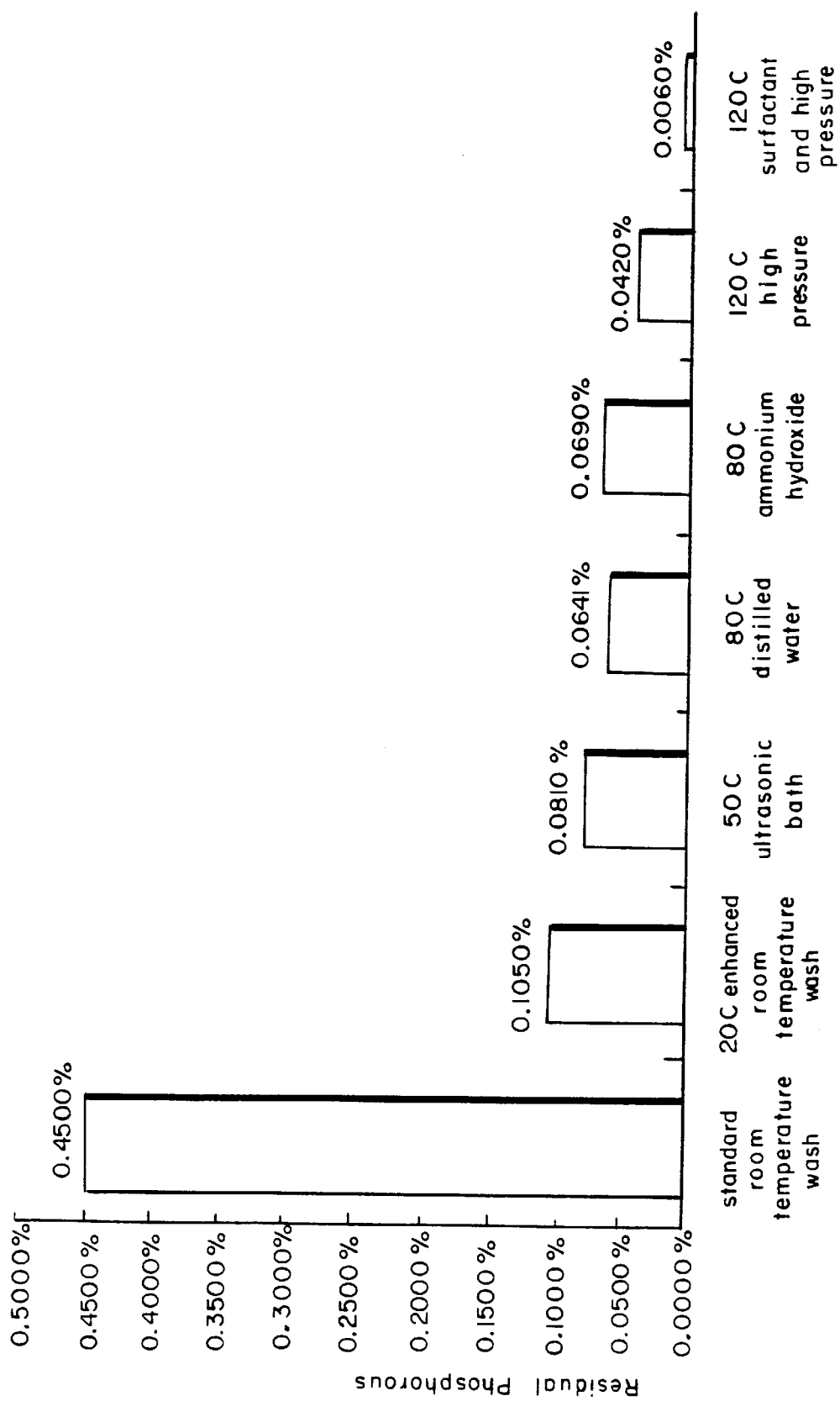
FIG. 18 shows the residual phosphorous in a film comprising PBO as a function of processing methods.

The control tube, Tube 1, received no further washing and was dried with the standard 19-hr cycle. Photomicroscopy indicated a relatively featureless surface. With the exception of <5-μm-size particles, the film was relatively free of defects that would compromise the breakdown strength. Tube 2, soaked for 3 hr in a surfactant solution, then received three 1-hr-deionized water (DI water) washes at 80–95° C. The surfactant solution consisted of the following: 0.1 percent TRITON X-45, 60 percent deionized water, 40 percent ethanol. The surface of the tube had a textured appearance and several areas of the surface were covered with spots, believed to be residual surfactant. Tube 3 was soaked for 3 hr in the surfactant solution, then 1 hr in a 50 percent ethanol/50 percent water solution. It then received two 1-hr washes with hot DI water. The surface of this film was moderately cracked, but had no other identifiable features. Tube 4 was subjected to 3 hr in the surfactant solution, 1 hr in the 50 percent ethanol/50 percent water solution, 1 hr in water at 120° C. (using a pressure cooker at 2 atm), then a final 1-hr wash in hot DI water. Tube 5 was soaked for 3 hr in the surfactant solution, 2 hr in 50 percent ethanol/50 percent water changed once, and then 1 hr in DI water at 120° C. at 2 atm. The surface of the tube was featureless. The residual phosphorous in PBO films treated with surfactant and a high temperature, high pressure wash was less than 0.006%. The effects of different wash techniques on the residual phosphorous content in PBO films are shown in FIG. 18.

In FIG. 19, the loss factor of PBO film from Tube 1 is compared to PBO film from Tube 2, demonstrating the effect of surfactant treatment of PBO films. This figure shows there has been a dramatic reduction in the loss factor at higher temperatures. This effect seems to be less significant at lower temperatures. This effect is attributed to the increase in the mobility of residual phosphoric acid as the temperature of the system is increased.

The dielectric strength of the films as a function of washing treatments was measured to determine if these aggressive techniques affect the dielectric strength. These values are summarized in Table 7. This clearly indicates that the washing treatments do not significantly impact the dielectric strength.

TABLE 7

AC Voltage Breakdown Data

|  | Average Volts | Average Thickness (mil) | Average Volts/mil |
|---|---|---|---|
| Sample 1 | 1,270 | 0.20 | 6,354 |
| Sample 2 | 1,310 | 0.25 | 5,231 |
| Sample 3 | 1,340 | 0.27 | 5,010 |
| Sample 4 | 1,370 | 0.27 | 5,110 |
| Sample 5 | 1,320 | 0.29 | 4,603 |
| Sample 6 | 1,300 | 018 | 7,178 |
| Sample 7 | 1,250 | 0.26 | 4,885 |
| Sample 8 | 1,350 | 0.26 | 5,195 |
| Averages | 1,314 | 0.25 | 5,446 |

Sample No. 1: PBZT
Sample No. 2: PBO normal wash, sample 3,4 alcohol based wash
Sample No. 3: PBO surfactant washed—Tube No. 4
Sample No. 4: PBO surfactant washed—Tube No. 5
Sample No. 5: PBO hot Di H$_2$O wash—Tube No. 1
Sample No. 6,7: Metalized PBO film (1.67 in. diam) normal wash
Sample No. 8: Metalized PBO film (1.67 in. diam) PBO surfactant washed, alcohol based (No. 268-038-05)

b) The following examples demonstrate the use of TRITON X-100 as the surfactant.

Figure 1:
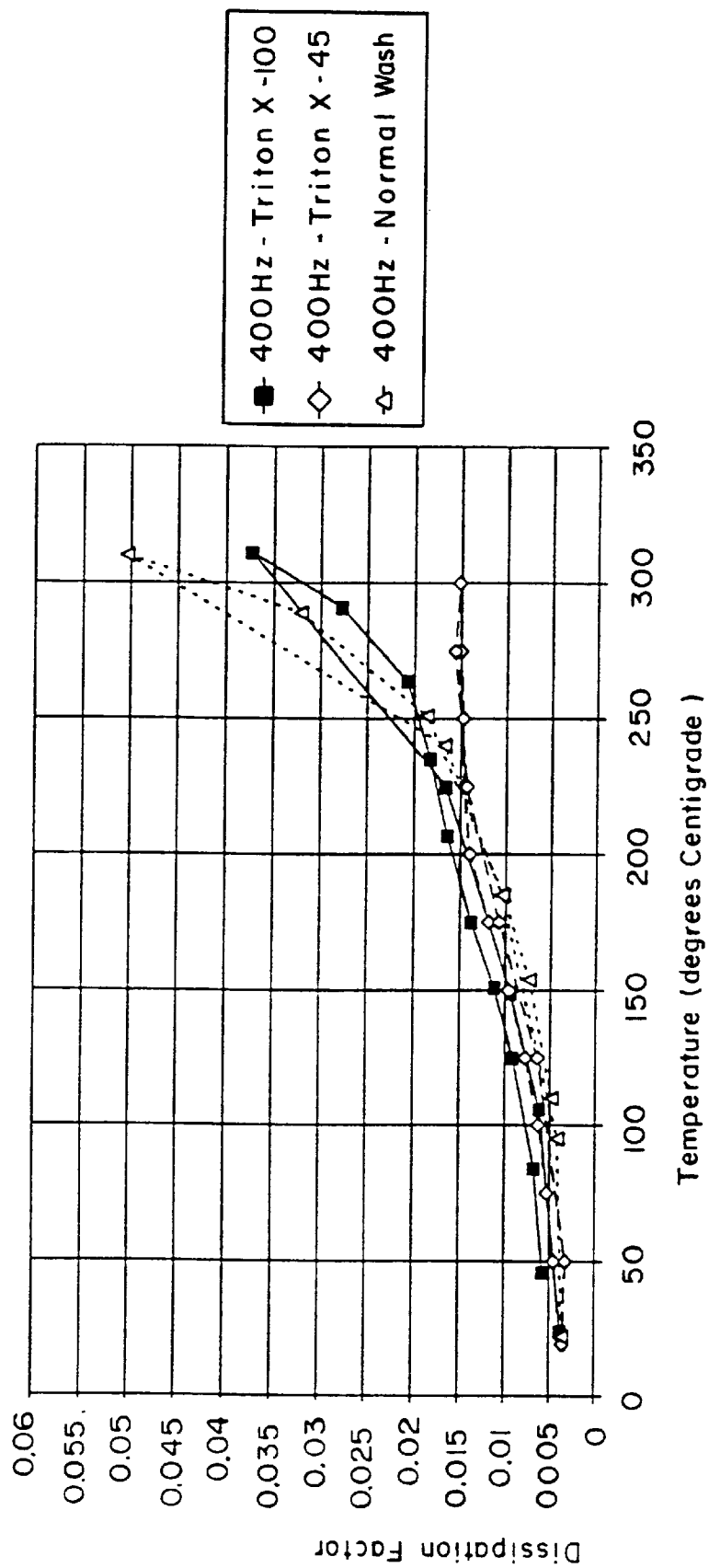
FIG. 1 shows loss (dissipation) factor as a function of temperature for biaxially oriented PBO films treated to remove residual ionic contamination.

(1) TRITON X-100 is water soluble at room temperature to 65° C., while TRITON X-45 requires the addition of ethanol to solubilize the surfactant. The use of TRITON X-100 instead of TRITON X-45 eliminates ethanol from the processing solution. FIG. 13 shows that the loss factor of TRITON X-100 treated PBO film was somewhat higher than that of the TRITON X-45. In order to measure the relative merit of each of these two surfactants and their appropriate processing methods, two control tubes were prepared for comparison. This control PBO film is referred to as the normal wash or standard wash film and loss factor as a function of temperature is also plotted in FIG. 1. Regardless of the surfactant chosen for this process, the film of the present invention has a loss factor that is sufficiently low to be useful for fabrication of the 300° C. filter capacitors of the present invention.

(2) Two sets of PBO films (orientation ±22 deg) were treated with two concentrations of TRITON X-100. All PBO tubes were initially washed in degassed, deionized water at 80 to 90° C. for 3 hr. During this time the entire volume of the wash water was changed three times. The surfactant treatment phase of the enhanced wash was performed at temperatures approaching 65° C. because at temperatures exceeding 65° C. the surfactant partially precipitates from solution (cloud point). Set One was washed in 0.1% XT-100 for 3 hr at 65° C. Set Two was washed at 0.5% XT-100 for 3 hr at 65° C. This surfactant treatment was followed by two (Set One) or three (Set Two) 65° C. distilled water washes and then a 120° C. wash in a commercial stainless steel pressure cooker at 2 atm.

One major difference between the TRITON X-100 treatment procedure and the X-45 treatment process is that the temperature for the X-45 process was 95° C. versus 65° C. for the X-100. This was possible with the TRITON X-45 solution because the addition of the ethanol to the wash solution increased the cloud point above the processing temperature. The cloud point of the X-100 introduces a maximum temperature of 65° C. in aqueous solutions. While higher temperatures are preferable, both TRITON X-100 and TRITON X-45 are useful in the method of the present invention. TRITON surfactant, X-165, differs from the other octylphenol nonionics in that x=16. This version of the TRITON series has a cloud point that exceeds 100° C. and will allow the high-temperature surfactant treatments in water without the addition of ethanol.

Surface analysis of PBO films and surface analysis of the interior of films that were split down the center were performed using Electron Spectroscopy for Chemical Analysis (ESCA). The spectra for the interior of the film, obtained by peeling the film just prior to analysis, showed a very small phosphorous peak. The spectra for the high-energy region showed the possible presence of a very small amount of sodium, probably due to the handling of the films. These values were at or below the detection limit of the equipment. There were no other contaminants in the film, and the film appeared to be quite pure. These results are summarized in Table 8. ESCA is insensitive to hydrogen, and the data in Table 8 are calculated without including hydrogen in the analysis. This testing also showed no difference in the amount of residual phosphorus at the surface versus the interior of the films.

TABLE 8

PBZT Peeled Surface: EC Quantification Data

| No. | Element | Peak Area | Sens. Factor | Corrected Area | Atomic % (without hydrogen) Measured | Atomic % (without hydrogen) Calculated |
|---|---|---|---|---|---|---|
| 1 | C1 | 50,310.0 | 0.25 | 201,240 | 75.4 | 78.0 |
| 2 | O1 | 4,442.4 | 0.67 | 6,630 | 2.5 | — |
| 3 | P1 | 431.3 | 0.38 | 1,135 | 0.4 | — |
| 4 | S1 | 16,511.5 | 0.54 | 30,577 | 11.5 | 11.0 |
| 5 | N1 | 11,636.0 | 0.43 | 27,060 | 10.1 | 11.0 |
|  |  |  |  | 266.642 | 100.0 |  |

The invention has been described in detail with particular reference to the preferred embodiments thereof. However, it will be appreciated that modifications and improvements within the spirit and scope of this invention may be made by those skilled in the art upon considering the present disclosure.

What is claimed is:

1. A capacitor comprising at least one layer of dielectric material wherein the at least one layer comprises a multi-axially oriented lyotropic liquid crystalline polymer film.

2. A capacitor in accordance with claim 1, wherein the lyotropic polymer film comprises a polybenzazole polymer.

3. A capacitor in accordance with claim 2, wherein the polybenzazole polymer comprises polybenzoxazole, polybenzothiazole or polybenzimidazole.

4. A capacitor in accordance with claim 1, wherein the capacitor is fabricated by a winding process.

5. A capacitor in accordance with claim 1, wherein the capacitor is fabricated by a lay-up procedure.

6. A capacitor in accordance with claim 1, wherein the multiaxial orientation of the lyotropic liquid crystalline polymer film is biaxial.

7. A capacitor in accordance with claim 6, wherein the biaxial orientation of the lyotropic liquid crystalline polymer film is from about ±5° to about ±45°.

8. A capacitor in accordance with claim 7, wherein the biaxial orientation of the lyotropic liquid crystalline polymer film is from about ±40° to ±45°.

9. A capacitor in accordance with claim 1, wherein the lyotropic liquid crystalline polymer film has a dissipation factor below about 0.002 at 1 kHz.

10. A capacitor in accordance with claim 1, wherein the lyotropic liquid crystalline polymer film has a breakdown strength greater than about 10 kV/mil.

11. A capacitor in accordance with claim 1, wherein the lyotropic liquid crystalline polymer film has an energy density of about 1 to 3 J/gm.

12. A capacitor in accordance with claim 1, wherein the lyotropic liquid crystalline polymer film has a dielectric loss factor from about 0.01 to 0.015 over a temperature range of 200 to 300° C.

13. A capacitor in accordance with claim 1, having an operating temperature of about 300 to 350° C.

14. A capacitor in accordance with claim 1, wherein the liquid crystalline polymer film has less than 0.5% of residual ionic contaminants.

15. A capacitor in accordance with claim 14, wherein the residual ionic contaminants comprise residual phosphorous.

16. A lyotropic liquid crystalline polymer film having less than 0.5% of residual ionic contaminants.

17. A lyotropic liquid crystalline polymer film in accordance with claim 16, wherein the residual ionic contaminants comprise residual phosphorous.

18. A lyotropic liquid crystalline polymer film in accordance with claim 16, wherein the film has a dissipation factor below about 0.002 at 1 kHz.

19. A lyotropic liquid crystalline polymer film in accordance with claim 16, wherein the film is multiaxially oriented.

20. A lyotropic liquid crystalline polymer film in accordance with claim 19, wherein the film is biaxially oriented from about ±5° to about ±45°.

21. A lyotropic liquid crystalline polymer film in accordance with claim 19, wherein the film is biaxially oriented from about ±40° to about ±45°.

\* \* \* \* \*